US012705106B1

(12) United States Patent
Manoharan et al.

(10) Patent No.: US 12,705,106 B1
(45) Date of Patent: Aug. 11, 2026

(54) PROVIDING VISIBILITY AND RECOMMENDATIONS FOR BATCH PROCESSING

(71) Applicant: Amazon Technologies, Inc., Seattle, WA (US)

(72) Inventors: Nirmal Ganesh Nirmal Manoharan, Seattle, WA (US); Xu Yang, Bellevue, WA (US); James Franz Riggleman, Shoreline, WA (US); Cheng-Hao Lee, Seattle, WA (US); Joanne Louise Adegbola, Redmond, WA (US); Kamini Graia, Acton, MA (US); Aswin Damodar, Seattle, WA (US); Jason Roy Rupard, Renton, WA (US); Michelle Leah Goodstein, Mercer Island, WA (US); Vinothkumar Narasimhan, Bellevue, WA (US); Naina Thangaraj, San Jose, CA (US); Nikhil Tahalramani, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 558 days.

(21) Appl. No.: 17/956,395

(22) Filed: Sep. 29, 2022

(51) Int. Cl.
*G06F 9/50* (2006.01)
*G06F 16/23* (2019.01)

(52) U.S. Cl.
CPC ............ *G06F 9/505* (2013.01); *G06F 9/5077* (2013.01); *G06F 16/2386* (2019.01); *G06F 2209/501* (2013.01); *G06F 2209/5019* (2013.01)

(58) Field of Classification Search
CPC .... G06F 9/505; G06F 9/5077; G06F 16/2386; G06F 2209/501; G06F 2209/5019
USPC .......................................................... 718/104
See application file for complete search history.

(56) References Cited

U.S. PATENT DOCUMENTS 5,752,030 A * 5/1998 Konno .................. G06F 9/5027 718/100
6,526,504 B1 * 2/2003 Veazey ............... G06F 11/3452 714/E11.197
6,675,220 B1 * 1/2004 Bergamasco ........... H04L 47/30 709/233

(Continued)

*Primary Examiner* — Adam Lee
(74) *Attorney, Agent, or Firm* — Perilla Knox & Hildebrandt LLP; Jonathan A. Paulis

(57) ABSTRACT

Techniques implemented by batch-processing service to provide users with visibility around execution metrics for their batch jobs, and determine more optimal scheduling policies and/or scaling algorithms for executing batch jobs. The batch-processing service may collect telemetry data for batch jobs, and analyze the telemetry data to generate execution metrics for the batch jobs. The batch-processing service uses these execution metrics to generate various visualizations that may be presented to users to provide the users with more visibility into the performance of their batch jobs. Additionally, the batch-processing service may analyze the execution metrics, and determine more optimized scheduling policies and/or scaling algorithms to use for running the batch jobs. In this way, the batch-processing service can increase the visibility given to users around the performance of their batch jobs, and can also identify modifications to scheduling and scaling in order to improve the performance of the batch jobs.

20 Claims, 13 Drawing Sheets

(56) References Cited

U.S. PATENT DOCUMENTS

| | | | | |
|---|---|---|---|---|
| 6,990,113 | B1 * | 1/2006 | Wang | H04L 47/50 370/429 |
| 7,266,612 | B1 * | 9/2007 | Heyman | H04L 47/30 370/235 |
| 7,382,725 | B1 * | 6/2008 | Kakadia | H04L 47/125 370/395.43 |
| 7,757,013 | B1 * | 7/2010 | Lawson | G06F 11/3409 710/15 |
| 8,050,854 | B1 * | 11/2011 | Chandra | G08G 1/081 701/119 |
| 8,612,785 | B2 * | 12/2013 | Brown | G06F 1/329 718/1 |
| 9,317,331 | B1 * | 4/2016 | Koh | G06F 9/5066 |
| 10,733,002 | B1 * | 8/2020 | Mackay | G06F 16/24556 |
| 10,877,814 | B2 * | 12/2020 | Aronovich | G06F 9/4856 |
| 11,138,033 | B1 * | 10/2021 | Sem | G06F 9/54 |
| 11,573,816 | B1 * | 2/2023 | Featonby | H04L 67/10 |
| 11,860,757 | B2 * | 1/2024 | Birk | G06F 11/3409 |
| 12,034,740 | B1 * | 7/2024 | Carmack | H04L 63/1416 |
| 2002/0029238 | A1 * | 3/2002 | Okuhata | G06Q 10/109 718/101 |
| 2006/0218285 | A1 * | 9/2006 | Talwar | G06F 9/5072 709/227 |
| 2007/0058651 | A1 * | 3/2007 | Bowen, Jr. | H04L 47/10 370/412 |
| 2007/0101331 | A1 * | 5/2007 | Krebs | G06F 9/453 718/101 |
| 2007/0198802 | A1 * | 8/2007 | Kavuri | G06F 3/0604 711/170 |
| 2007/0234363 | A1 * | 10/2007 | Ferrandiz | G06F 9/46 718/101 |
| 2007/0248005 | A1 * | 10/2007 | Pan | H04L 47/215 370/230 |
| 2008/0059214 | A1 * | 3/2008 | Vinberg | G06Q 10/067 705/348 |
| 2008/0177963 | A1 * | 7/2008 | Rogers | H04L 47/10 711/E12.103 |
| 2008/0215409 | A1 * | 9/2008 | Van Matre | G06Q 10/0631 705/7.12 |
| 2008/0250356 | A1 * | 10/2008 | Johns | G06F 3/04815 715/853 |
| 2008/0261663 | A1 * | 10/2008 | Park | H04W 52/0229 455/574 |
| 2010/0153945 | A1 * | 6/2010 | Bansal | G06F 9/4881 718/1 |
| 2010/0162246 | A1 * | 6/2010 | Tollefson | G06F 16/248 707/E17.014 |
| 2010/0306776 | A1 * | 12/2010 | Greene | H04L 47/822 718/101 |
| 2011/0007631 | A1 * | 1/2011 | Raina | H04L 49/90 370/230 |
| 2011/0138397 | A1 * | 6/2011 | Kikuchi | G06F 11/3452 718/106 |
| 2013/0007753 | A1 * | 1/2013 | Jain | G06F 9/4881 718/103 |
| 2013/0021358 | A1 * | 1/2013 | Nordlund | G06T 11/40 345/581 |
| 2013/0097601 | A1 * | 4/2013 | Podvratnik | G06F 9/45558 718/1 |
| 2015/0089505 | A1 * | 3/2015 | Malaiyandisamy | G06F 9/5072 718/101 |
| 2015/0277976 | A1 * | 10/2015 | De | G06F 9/4843 718/101 |
| 2015/0324379 | A1 * | 11/2015 | Danovitz | H04N 21/2743 707/825 |
| 2016/0103677 | A1 * | 4/2016 | Melski | G06F 9/5038 717/120 |
| 2016/0212064 | A1 * | 7/2016 | Biswas | H04L 67/10 |
| 2016/0277255 | A1 * | 9/2016 | Dasgupta | G06F 9/505 |
| 2016/0316284 | A1 * | 10/2016 | Javidi | H04Q 11/0005 |
| 2016/0350146 | A1 * | 12/2016 | Udupi | G06F 9/5027 |
| 2016/0352528 | A1 * | 12/2016 | Law | H04L 47/803 |
| 2017/0060642 | A1 * | 3/2017 | Castellano | G06F 9/45558 |
| 2017/0075622 | A1 * | 3/2017 | Kwon | G06F 3/0613 |
| 2017/0090961 | A1 * | 3/2017 | Wagner | G06F 9/45533 |
| 2017/0109199 | A1 * | 4/2017 | Chen | G06F 9/5027 |
| 2017/0147681 | A1 * | 5/2017 | Tankersley | G06F 11/3006 |
| 2017/0177397 | A1 * | 6/2017 | Gao | G06F 9/5077 |
| 2017/0195247 | A1 * | 7/2017 | Tao | H04L 67/10 |
| 2017/0235817 | A1 * | 8/2017 | Deodhar | G06F 16/9535 707/736 |
| 2018/0131574 | A1 * | 5/2018 | Jacobs | H04L 43/0817 |
| 2018/0181415 | A1 * | 6/2018 | Balkan | G06F 9/4881 |
| 2018/0189046 | A1 * | 7/2018 | Kunisetty | G06F 11/2289 |
| 2018/0203739 | A1 * | 7/2018 | Brady | G06F 9/45558 |
| 2018/0241843 | A1 * | 8/2018 | Bardhan | G06N 3/084 |
| 2018/0287956 | A1 * | 10/2018 | Bryc | G06F 9/5005 |
| 2018/0349191 | A1 * | 12/2018 | Dorsey | G06F 9/5044 |
| 2019/0163546 | A1 * | 5/2019 | Ungar | G06F 11/079 |
| 2019/0266014 | A1 * | 8/2019 | Bahl | G06N 20/00 |
| 2019/0319839 | A1 * | 10/2019 | Nozhchev | H04L 41/14 |
| 2019/0325304 | A1 * | 10/2019 | Gottin | G06N 3/045 |
| 2019/0362248 | A1 * | 11/2019 | Rogynskyy | G06F 16/2228 |
| 2020/0257968 | A1 * | 8/2020 | Mitra | H04L 67/51 |
| 2020/0301723 | A1 * | 9/2020 | Gabrielson | H04L 67/75 |
| 2020/0301801 | A1 * | 9/2020 | Hegde | G06F 11/302 |
| 2020/0379875 | A1 * | 12/2020 | Krishnaswamy | G06F 11/0784 |
| 2020/0409754 | A1 * | 12/2020 | Li | G06F 9/4887 |
| 2021/0004250 | A1 * | 1/2021 | Arya | G06F 9/45558 |
| 2021/0021545 | A1 * | 1/2021 | Srivastava | H04L 47/32 |
| 2021/0073026 | A1 * | 3/2021 | Myers | G06F 11/3065 |
| 2021/0096913 | A1 * | 4/2021 | Nadeau | G06N 5/04 |
| 2021/0099517 | A1 * | 4/2021 | Friedrich | H04L 67/1031 |
| 2021/0109346 | A1 * | 4/2021 | Backer | G06T 11/40 |
| 2021/0357280 | A1 * | 11/2021 | Long | G06F 11/328 |
| 2021/0377033 | A1 * | 12/2021 | Teran Guajardo | H04L 67/146 |
| 2022/0083816 | A1 * | 3/2022 | Cmielowski | G06N 20/00 |
| 2022/0107744 | A1 * | 4/2022 | Capelo | G06N 20/00 |
| 2022/0107870 | A1 * | 4/2022 | Nagarajegowda | G06F 11/1451 |
| 2022/0188148 | A1 * | 6/2022 | Zhu | G06F 9/4881 |
| 2022/0395754 | A1 * | 12/2022 | Ballard | A63F 13/42 |
| 2023/0039566 | A1 * | 2/2023 | Ghag | G06F 11/0736 |
| 2023/0153166 | A1 * | 5/2023 | Bawcom | G06F 8/60 718/1 |
| 2023/0267019 | A1 * | 8/2023 | Edwards | G06F 9/505 719/318 |
| 2023/0281115 | A1 * | 9/2023 | Sallese | G06F 3/0679 |
| 2023/0325232 | A1 * | 10/2023 | Enumulapally | G06F 9/46 |
| 2024/0069961 | A1 * | 2/2024 | Samson | G06F 9/4843 |
| 2024/0069999 | A1 * | 2/2024 | Yan | G06F 11/079 |

* cited by examiner

800

RECEIVE, AT A BATCH-PROCESSING SERVICE, A REQUEST TO EXECUTE A BATCH JOB ON BEHALF OF A USER ACCOUNT REGISTERED WITH THE BATCH-PROCESSING SERVICE
902

DETERMINE, USING A FIRST SCHEDULING POLICY, A TIME AT WHICH THE BATCH-PROCESSING SERVICE IS TO EXECUTE THE BATCH JOB
904

CAUSE, BASED AT LEAST IN PART ON THE TIME, EXECUTION OF THE BATCH JOB ON VIRTUAL COMPUTE INSTANCES ASSOCIATED WITH THE BATCH-PROCESSING SERVICE
906

COLLECT TELEMETRY DATA ASSOCIATED WITH THE EXECUTION OF THE BATCH JOB ON THE VIRTUAL COMPUTE INSTANCES
908

PROCESS THE TELEMETRY DATA TO DETERMINE AN EXECUTION METRIC REPRESENTING A PERFORMANCE FOR THE EXECUTION OF THE BATCH JOB
910

DETERMINE, BASED AT LEAST IN PART ON THE EXECUTION METRICS, A SECOND SCHEDULING POLICY THAT IS MORE OPTIMIZED THAN THE FIRST SCHEDULING POLICY TO SCHEDULE SUBSEQUENT JOBS ON BEHALF OF THE USER ACCOUNT
912

USING THE SECOND SCHEDULING POLICY, CAUSE EXECUTION OF A SUBSEQUENT BATCH JOB AT A SUBSEQUENT TIME
914

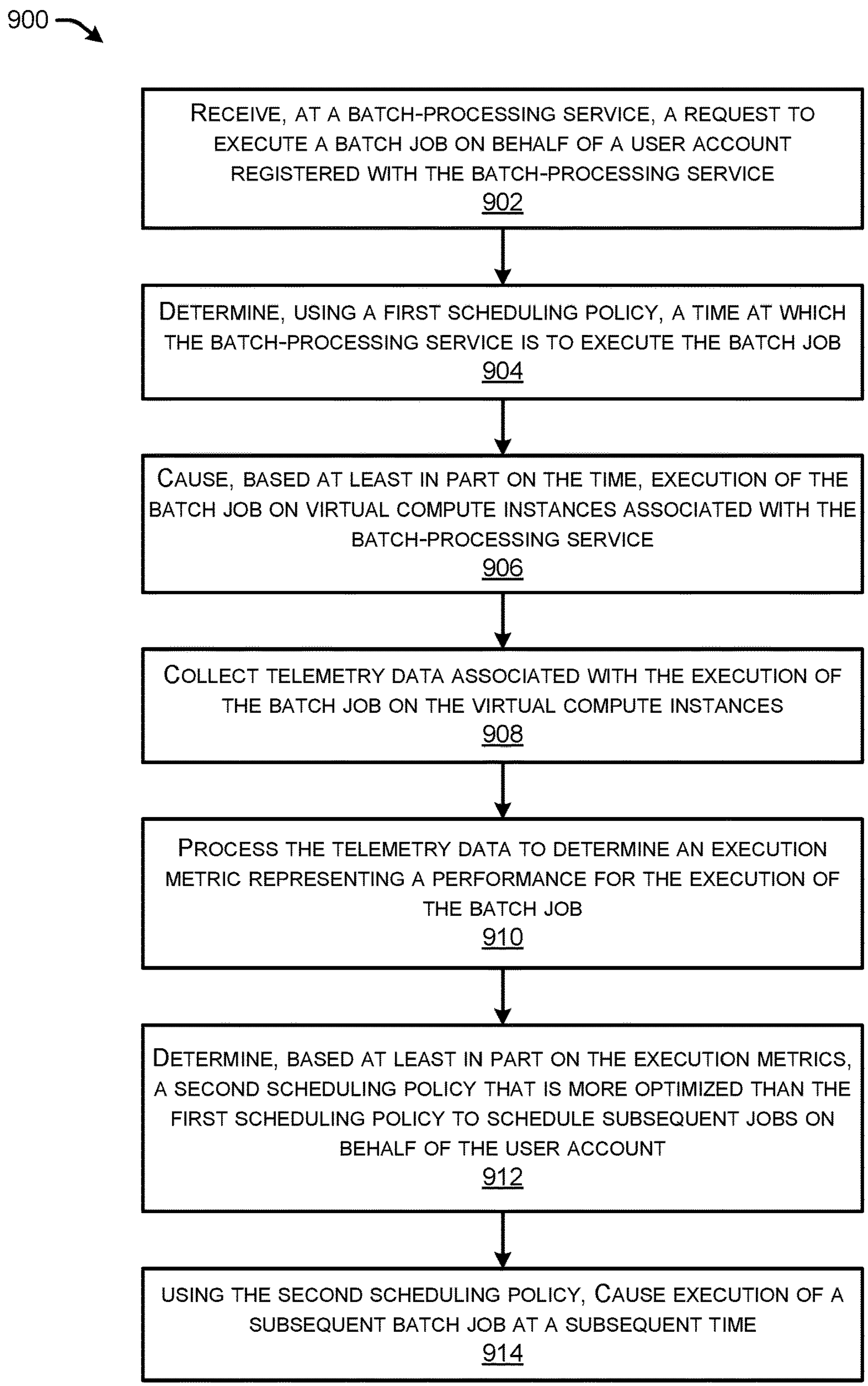

FIG. 9

PROVIDING VISIBILITY AND RECOMMENDATIONS FOR BATCH PROCESSING

BACKGROUND

Service providers offer cloud-based services to fulfill users' computing-service needs without the users having to invest in and maintain computing infrastructure required to implement their services. These service providers maintain networks of managed computing resources and functionality to implement various types of scalable, on-demand services to provide to users. Specifically, the service providers may maintain networks of data centers, which in turn may include a number of interconnected computing devices (or "servers"), that provide computing resources to support services for the users. Service providers often support batch-processing services which provide automated processes for running software workloads, or jobs, in large batches. These batch-processing services automate the scheduling of batch jobs on behalf of users according to predefined scheduling policies, and also automate the task of scaling up or down virtual computing resources on which the batch jobs run. Due to the high amount of computing resources used to run these batch jobs, service providers have to maintain large computing infrastructures to run the batch jobs. Accordingly, even small inefficiencies in how these batch-processing services execute these batch jobs, such as scheduling or scaling inefficiencies, can result in large amounts of waste or misuse of computing resources, as well as poor user experience around the execution of their batch jobs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a flow diagram of an example method for a batch-processing service that executes a batch job, and uses an execution metric for the batch job to identify a more optimal scheduling policy.

DETAILED DESCRIPTION

Figure 1:
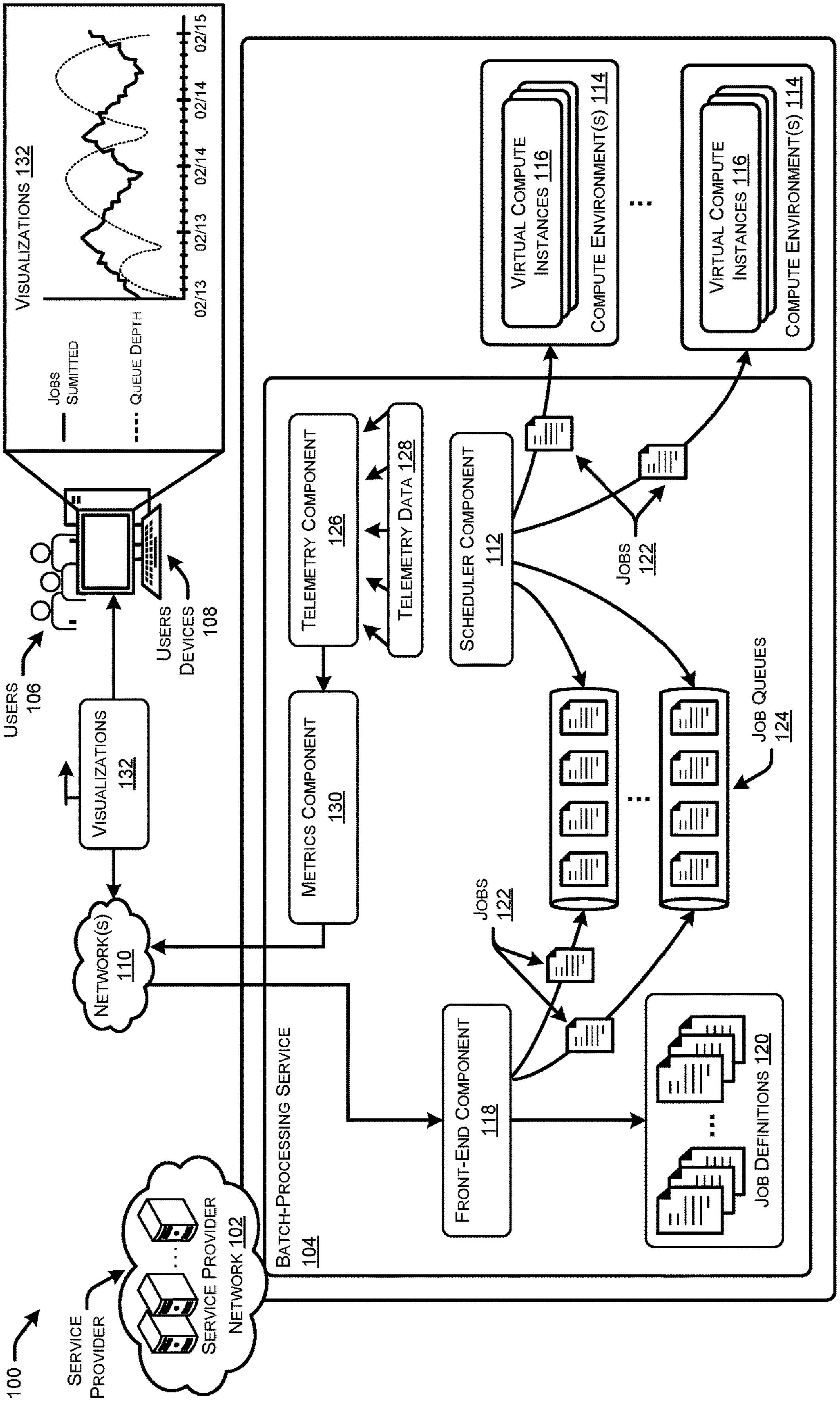
FIG. 1 illustrates a system-architecture diagram of an example environment in which a batch-processing service executes batch jobs for users, provides visualizations around execution metrics for the batch jobs, and determines more optimized scheduling policies and/or scaling algorithms for running batch jobs.

This disclosure describes techniques implemented by batch-processing service to provide users with visibility into the execution and performance of their batch jobs, and determine more optimal scheduling policies and/or scaling algorithms for executing batch jobs. The batch-processing service may collect telemetry data for batch jobs that are executed by the service, and analyze the telemetry data to generate execution metrics for the batch jobs. The batch-processing service then uses these execution metrics to generate various visualizations that may be presented to users to provide the users with more visibility into the performance of their batch jobs. Additionally, the batch-processing service may use the execution metrics to identify bottlenecks or other performance issues with the execution of the batch jobs. To solve these performance issues, the batch-processing service may analyze the execution metrics, such as by using machine-learning (ML) models, and determine more optimized scheduling policies and/or scaling algorithms to use for running the batch jobs. In this way, the batch-processing service can increase the visibility given to users around the performance of their batch jobs, and can also identify modifications to scheduling and scaling in order to improve the performance of the batch jobs.

As described herein, a batch job may be a program or set of programs, called jobs, that are automatically dispatched and processed by a computer or set of computers without requiring user interaction beyond submission of the batch job. In some examples, batch jobs may be program(s) that are scheduled to run on a computing device or system without further interaction. Further, as used herein, a workload may include multiple sets of jobs, such as sets of batch jobs, that perform different functions of the workload. For instance, a workload may be an application or service of a user that is comprised of many different batch jobs that execute to collectively perform features of the application or service.

Generally, in order to use batch-processing services, users register for an account with service providers and provide job definitions to the batch-processing service that represent their batch jobs. These job definitions include the code for the batch jobs as well as dependencies, and the users can further specify various execution parameters and job dependencies. For instance, users can provide scheduling policies that define timing parameters, priority listings, and/or other parameters usable by the batch-processing service to execute batch jobs of the users according to a desired timing and/or priority of the users.

The batch-processing service provides job queues as well as compute environment definitions that are used to service batch jobs requests. As requests to execute batch jobs are received from user accounts, they are stored in one or more job queues for that user account. User accounts may utilize a single job queue, or may potentially have multiple job queues with different priority levels. The batch-processing service stores the batch jobs in these job queues until compute resources are available to execute the jobs. A scheduler component of the batch-processing service evaluates when, where, and how to run jobs that have been submitted to a queue based on the resource requirements of each job. The scheduler component may evaluate the priority of each queue and runs jobs in priority order on optimal compute resources (e.g., memory vs CPU optimized), as long as those jobs have no outstanding dependencies. In addition to, or as an alternative to, considering priority, the scheduler component may utilize scheduling policies for the user accounts that define times at which batch jobs are to be executed, or timing guidelines for the schedule to consider when scheduling different batch jobs for execution.

To run the batch jobs, the batch-processing service generally scales up and/or down the amount of virtual computing instances (e.g., virtual machines (VMs), containers, serverless functions, etc.) to support different batch jobs. The batch-processing service may determine how to allocate, or scale, computing resources using various methods or techniques. Users can enroll in a managed experience where the batch-processing service selects a scaling algorithm and virtual computing instance type that best fits the needs of the jobs (e.g., sufficient compute, memory, storage, etc.). In some embodiments, users can enroll in an unmanaged experience where the users themselves define scaling algorithms or parameters and a virtual computing instance type for their various batch jobs. Thus, the batch-processing service uses scaling parameters, virtual computing instances types, and/or other scaling information to scale up and down virtual computing instances to run batch jobs for users.

The batch-processing service may store or maintain various types of historical telemetry data for the execution of the batch jobs. The telemetry data may be logged by the batch-processing service and may be time-series data that is logged for different stages of execution of the batch jobs, and by different components of the execution pipeline. For instance, a front-end component of the batch-processing service may store telemetry information about the batch job arrival rate and distribution. The batch scheduler component may log and store telemetry information about the durations and/or sizes of the batch jobs. A controller that manages the scaling of the virtual computing instances may store telemetry information around the virtual computing instance types, the scaling algorithms, amounts of computing resources utilized by batch jobs, and/or other execution data.

The batch-processing service may periodically, or continuously, collect or receive the various types of telemetry information and analyze the information to generate execution metrics for the batch jobs. Generally, the batch-processing service may use the telemetry data to determine more insightful metrics. As an example, the batch-processing service may parse and time-series entries in logs that represent the timing and results for job executions, such as successful jobs, failed jobs, and/or retried jobs. The batch-processing service may generate execution metrics that indicate, over a period of time, how many batch jobs were successfully completed, how many batch jobs failed, how many batch jobs were retried, and/or other metrics. The batch-processing service may then generate one or more visualizations that represent these execution metrics and are easily digestible by the users, and provide the users with access to these execution metrics and/or visualizations (e.g., via a dashboard or console). In this way, telemetry data may be collected, used to create insightful execution metrics, and used to provide visualizations representing performance characteristics of the batch jobs of users.

Further, the batch-processing service may utilize the execution metrics to determine how efficiently batch jobs are being executed. For instance, the batch-processing service may identify long delays between when a job is submitted and when execution begins, determine that execution of the jobs is taking longer that a desired or specified period of time, and/or identify other performance issues. The batch-processing service may determine how to fix these performance issues, such as by modifying or using new scheduling policies, modifying or using different scaling algorithms, and so forth.

In some instances, the batch-processing service may utilize one or more models that have been trained to identify optimized, or more optimal, scheduling policies and/or scaling algorithms for batch jobs. The models may be any type of models, such as ML models, rule-based models, heuristic-based models, and so forth. These models may have been trained using training data for various batch jobs that are performing well, or above certain performance thresholds, indicating that the scheduling policies and scaling algorithms are well suited for the various batch jobs. The models may then receive the execution metrics of the batch jobs and output optimal scheduling policies and/or scaling algorithms for the batch jobs. The batch-processing service may provide recommendations to users that they change their scheduling policies and/or scaling algorithms to be in line with the optimal policies and/or algorithms. Alternatively, the batch-processing service may automatically begin using the more optimal scheduling policies and/or scaling algorithms for running batch jobs on behalf of users (e.g., if the users opted in for this option).

According to the techniques described herein, batch-processing services may provide users with visibility regarding performance metrics for their batch jobs. Users can digest these metrics and/or visualizations and determine one or more changes for their scheduling policies, scaling algorithms/parameters, and so forth, to improve performance around execution of their batch jobs. Additionally, or alternatively, the batch-processing service may analyze the execution metrics and identify optimized, or more optimal, scheduling policies and/or scaling algorithms for batch jobs. Accordingly, the techniques described herein may increase efficiencies around the scheduling and scaling for running users' batch jobs, which in turn improves the utilization of computing resources, reduces the amount of time taken to run batch jobs, and improves the performance of a batch-processing service that runs the batch jobs.

The techniques described herein are with reference to a service provider network, such as a cloud provider network or platform, and networks such as VPCs, subnetworks (or "subnets"). However, the techniques are equally applicable to any network and in any environment. For example, the batch-processing service may monitor an on-premises network, and in such examples, the batch-processing service may provide execution metrics, visualizations, and/or recommendations to an administrator device associated with the on-premises network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a batch-processing service 104 executes batch jobs for users 106, provides visualizations around execution metrics for the batch jobs, and determines more optimized scheduling policies and/or scaling algorithms for running batch jobs.

The service provider network 102 may be operated and/or managed by a service provider and may provide various services to users to fulfil their computing resource needs, such as cloud-based computing resources. For instance, users 106 may operate user devices 108 in order to register for use of the computing resources of the service provider network 102. The service provider network 102 may include a batch-processing service 104 that includes various components for executing batch jobs for users 106, provides visualizations around execution metrics for the batch jobs, and determines more optimized scheduling policies and/or scaling algorithms for running batch jobs. Generally, the batch-processing service 104 may be, at least partly, a control-plane system that controls operations occurring in the service provider network. The batch-processing service 104 may be either centralized or distributed, and be supported by one or more computing devices.

As illustrated, a service provider network 102 may be operated and/or managed by a service provider. The service provider network 102 may provide various services to users 106 to fulfil their computing resource needs, such as cloud-based computing resources. For example, the service provider network 102 may provide cloud-based, scalable, and network accessible compute power services, storage services, database services, and/or other services. Users 106 may utilize user devices 108 to subscribe for use of the computing resources and/or services provided by the service provider network 102.

As shown, the batch-processing service 104 may include a front-end component 118 that performs various actions for interacting with users 106 and/or handling requests to perform batch jobs 122. The front-end component 118 may receive, store, and manage job definitions 120 on behalf of the users 106. In order to use the batch-processing service 104, users 106 register for an account with the service provider network 102 and provide job definitions 120 to the front-end component 118 that represent their batch jobs 122. These job definitions 120 include the code for the batch jobs as well as the dependencies, and the users 106 can further specific various execution parameters and job dependencies. The job definitions 120 can specify resource requirements, such as virtual CPU and memory, access roles, container/VM properties, and so forth. Further, user 106 can define, in the job definitions 120, dependencies between different jobs 122. For example, a batch job 122 can be composed of three different stages of processing with differing resource needs. With dependencies in the job definitions 120, users 106 can create three jobs with different resource requirements where each successive job depends on the previous job 122.

The batch-processing service 104 may include job queues 124 for the users 106. Generally, jobs 122 are submitted to a job queue 124 where they reside until they can be scheduled to run in a compute environment 114. A user account can have multiple job queues 124. For example, a user 106 can create a queue 124 that uses on-demand instances for high priority jobs and another queue 124 that uses different instances for low-priority jobs. Job queues 124 have a priority that's used by the scheduler component 112 to determine which jobs 122 in which queue 124 should be evaluated for execution first.

As job requests and/or schedule jobs arrive at the front end-component 118, batch jobs 122 are then stored in the job queues 124 until the scheduler component 112. The scheduler component 112 may evaluate the priority of each queue 124 and runs jobs 122 in priority order on optimal compute resources (e.g., memory vs CPU optimized), as long as those jobs 122 have no outstanding dependencies. In addition to, or as an alternative to, considering priority, the scheduler component 112 may utilize scheduling policies for the user accounts that define times at which batch jobs 122 are to be executed, or timing guidelines for the schedule to consider when scheduling different batch jobs 122 for execution.

The scheduler component 112 may retrieve batch jobs 122 from the job queues 124 using a scheduling policy and/or priorities for the different batch jobs 122. Generally, job queues 124 are mapped to one or more compute environments 112. Compute environments 112 contain virtual compute instances 116, such as VMs, containers that are used to run containerized batch jobs 122, and so forth. A specific compute environment 114 can also be mapped to one or more than one job queue 124. Within a job queue 124, the associated compute environments 114 each have an order that's used by the scheduler component 112 to determine where jobs 122 that are ready to be run should run. If the first compute environment 114 has a status of VALID and has available resources, the job 122 is scheduled to a virtual compute instance 116 within that compute environment 114. If the first compute environment 114 has a status of INVALID or can't provide a suitable compute resource, the scheduler component 112 attempts to run the job 122 on the next compute environment 114.

The virtual compute instances 116 describes herein may be of different "types," meaning they are allocated different ratios of computing resources and/or different amounts of computing resources. For instance, the virtual compute instances 116 may have differing ratios of CPU, memory, storage, networking, etc., and/or different amounts of the computing resources. In this way, different types of the virtual compute instances 116 may be more optimized to run different types of batch jobs 122 based on consumption characteristics of those batch jobs 122.

To run the batch jobs 122, the batch-processing service 104 generally scales up and/or down the amount of virtual computing instances 116 (e.g., virtual machines (VMs), containers, serverless functions, etc.) to support different batch jobs 122. The batch-processing service 104 may determine how to allocate, or scale, computing resources using various methods or techniques. Users 106 can enroll in a managed experience where the batch-processing service 104 selects a scaling algorithm and virtual computing instance type that best fits the needs of the jobs 122 (e.g., sufficient compute, memory, storage, etc.). In some embodiments, users 106 can enroll in an unmanaged experience where the users 106 themselves define scaling algorithms or parameters and a virtual computing instance type for their various batch jobs 122. Thus, the batch-processing service 104 uses scaling parameters, virtual computing instances types, and/or other scaling information to scale up and down virtual computing instances 116 to run batch jobs 122 for users 106.

During the batch job 122 processing pipeline, various telemetry data 128 may be created and logged or stored by components of the batch-processing service 104. The telemetry data 128 may be logged by the batch-processing service 104 and may be time-series data that is logged for different stages of execution of the batch jobs 122, and for different components of the execution pipeline. For instance, the front-end component 118 may store telemetry information 128 about the batch job 122 arrival rate and distribution. The scheduler component 112 may log and store telemetry information 128 about the durations and/or sizes of the batch jobs 122. A controller that manages the scaling of the virtual computing instances 116 may store telemetry information 128 around the virtual computing instance types, the scaling algorithms, amounts of computing resources utilized by batch jobs, and/or other execution data.

In some instances, the telemetry data 128 may be stored in a workload log, or a job 122 log, where each line in the log is a record of a job 122 that was run by the batch-processing service 104. The column of each record may include a time at which the job 122 request was created, when the job 122 was runnable, when the job 122 was started, when the job 122 was stopped, a size of the job 122, a job definition 120 of the job 122, and so forth. Further the telemetry data 128 may be stored in a compute resource log where each line of that log is a record of a snapshot of the compute resources launched for the job 122. The columns of each record may include timestamp data, a resource type and/or quantity launched for the batch job 122, a running duration for the batch job 122, and so forth.

The telemetry component 126 may periodically, or continuously collect or receive the various types of telemetry data 128 and provide the telemetry data 128 to a metrics component 130. The metrics component 130 may analyze the telemetry data 128 to generate execution metrics for the batch jobs 122. Generally, the metrics component 130 may use the telemetry data 128 to determine more insightful metrics around the batch jobs 122. As an example, the metrics component 130 may parse time-series entries in logs that represent the timing and results for job 122 executions, such as successful jobs 122, failed jobs 122, and/or retried jobs 122 (e.g., failed once and attempted to run again). The metrics component 130 may generate execution metrics that indicate, over a period of time, how many batch jobs 122 were successfully completed, how many batch jobs 122 failed, how many batch jobs 122 were retried, and/or other metrics. The batch-processing service 104 may then generate one or more visualizations 132 that represent these execution metrics and are easily digestible by the users 106, and provide the users 106 with access to these execution metrics and/or visualizations 132 (e.g., via a dashboard or console). In this way, telemetry data 128 may be collected, used to create insightful execution metrics, and provide visualizations 132 representing performance characteristics of the batch jobs 122 of users 106.

As shown, one or more visualizations 132 of the execution metrics may be sent over the network(s) 110 to user devices 108. The visualizations 132 in this example depict a run time indicating how many jobs 122 are being submitted to job queues 124 to be executed by the batch-processing service 104. Further, the visualizations 132 depict queue depth for a job queues 124 of the user account indicating how many batch jobs 124 are stored in the job queues 124 and waiting to be executed over the period of time. As illustrated, as the metric for jobs submitted increases, the queue depth increases a short period of time after the peak of the submissions.

Further, the batch-processing service 104 may utilize the execution metrics to determine how efficiently batch jobs 122 are being executed. For instance, the batch-processing service 104 may identify long delays between when a job 122 is submitted and when execution begins, determine that execution of the jobs 122 is taking longer that a desired or specified period of time, and/or identify other performance issues. The batch-processing service 104 may determine how to fix these performance issues, such as by modifying or using new scheduling policies, modifying or using different scaling algorithms, and so forth.

In some instances, the batch-processing service 104 may utilize one or more models that have been trained or generated to identify optimized, or more optimal, scheduling policies and/or scaling algorithms for batch jobs 122. These models may have been trained using training data for various batch jobs 122 that are performing well, or above certain performance thresholds, indicating that the scheduling policies and scaling algorithms are well suited for the various batch jobs 122. The models may then receive the execution metrics of the batch jobs 122 and output optimal scheduling policies and/or scaling algorithms for the batch jobs. The batch-processing service 104 may provide recommendations to users 106 that they change their scheduling policies and/or scaling algorithms to be in line with the optimal policies and/or algorithms. Alternatively, the batch-processing service 104 may automatically begin using the more optimal scheduling policies and/or scaling algorithms for running batch jobs 122 on behalf of users 106.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 102 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users 106 can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 102 may provide on-demand, scalable computing services to users 106 through a network, for example allowing users 106 to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 106 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 106, the hardware associated with the virtual computing devices can be scaled up or down depending upon the resources the user 106 requires. Organizations can choose to deploy their virtual computing systems to provide network-based services for their own use and/or for use by their users or clients.

The cloud provider network 102 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users 106 of the cloud provider network 102, which may be provisioned in user accounts.

Generally, the batch-processing system 104, and components thereof, may comprise computing devices, systems, or other hardware along with software, firmware, and/or other logic that is supported one computing device, or across more computing devices in the service provider network 102. Additionally, the batch-processing system 104 may comprise a system of other devices. The techniques described herein are generally described with respect to a service provider network 102, such as a cloud provider network or platform. However, the techniques are generally applicable for any network, such as on-premises networks, hybrid networks, and so forth.

Figure 2:
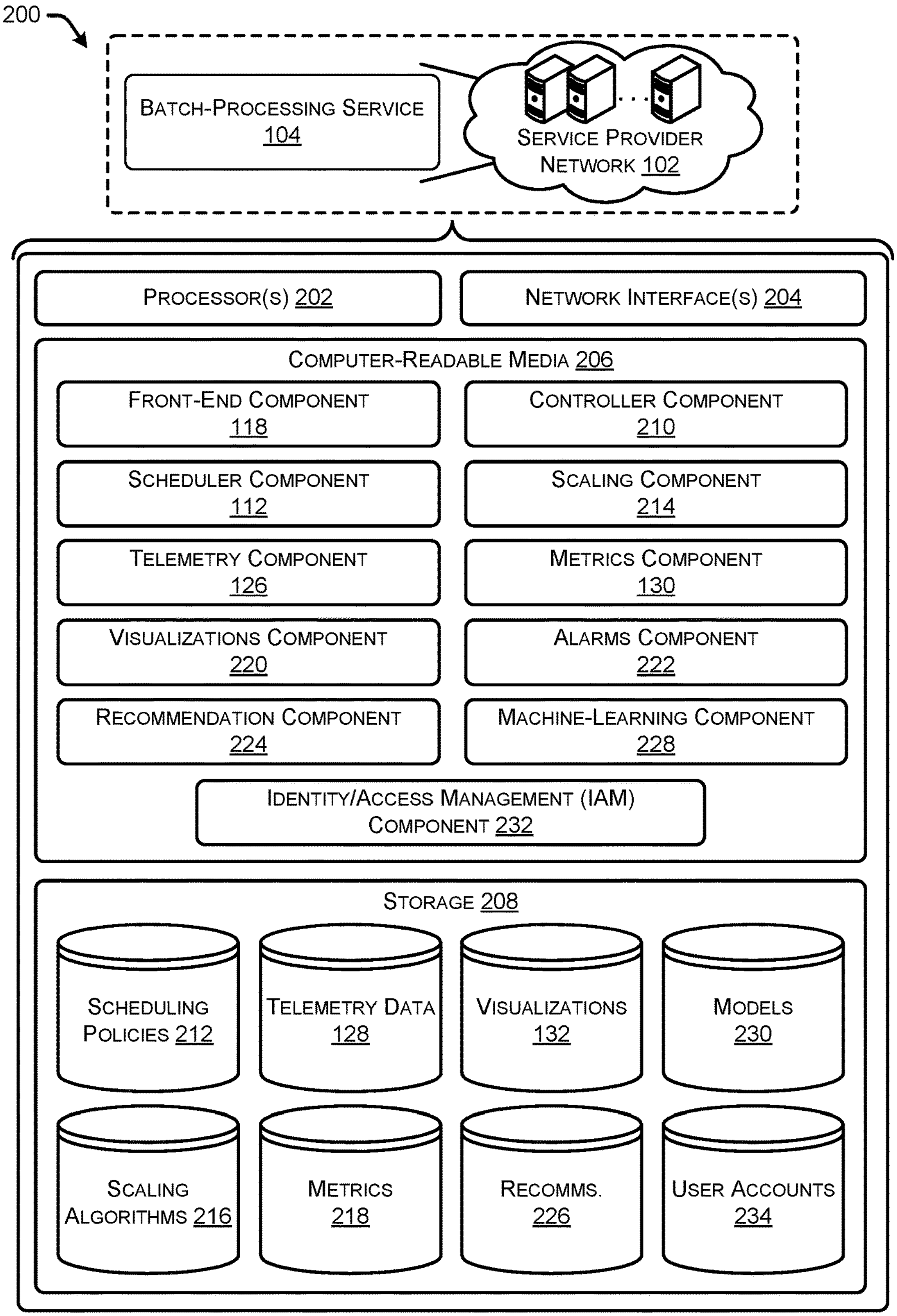
FIG. 2 illustrates a component diagram of example components of a batch-processing service that provides user accounts with visualizations of execution metrics for their batch jobs, and determines more optimized scheduling policies and/or scaling algorithms for running batch jobs.

FIG. 2 illustrates a component diagram 200 of example components of a batch-processing service 104 that provides user accounts with visualizations of execution metrics for their batch jobs 122, and determines more optimized scheduling policies and/or scaling algorithms for running batch jobs.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s), and/or other systems or devices in the service provider network 102 and/or remote from the service provider network 102. The network interfaces 204 may include devices configured to couple to various networks, such as the network(s) 110, which may include one or more of personal area networks (PANs), wired and wireless local area networks (LANs), wired and wireless wide area networks (WANs), and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include a data store, or storage 208, which may comprise one, or multiple, repositories or other storage locations for persistently storing and managing collections of data such as databases, simple files, binary, and/or any other data. The storage 208 may include one or more storage locations that may be managed by one or more database management systems.

The computer-readable media 206 may store portions, or components, of the batch-processing service 104 described herein. For instance, the computer-readable media 206 may store and/or execute a controller component 210 that performs various functions for managing the virtual compute instances 116. For instance, the controller component 210 may be a controller that manages clusters of containers, or other control-plane component that controls, manages, or orchestrates virtual compute instances 116.

The computer-readable media 206 may store and/or execute a scaling component 214 that is configured to perform the various scaling techniques described herein. For instance, the scaling component 214 may scale up or down the virtual compute instances 116 to run a job according to various scaling algorithms. The scaling component 214 may determine types of virtual compute instances 116 for different jobs 122 using the job definitions 120, and may scale up and/or down according to a timeline and/or algorithm.

The computer-readable media 206 may store and/or execute a visualizations component 220 configured to generate visualizations that represent the execution metrics for the batch jobs 122. Further, the computer-readable media 206 may store and/or execute an alarms component 222 with which users 106 may interact to define alarms or thresholds for their execution metrics. If execution metrics violate these thresholds, the alarms component 222 may generate an alert or alarm that is sent to the user 106 (e.g., alarm in a console or dashboard of a user account, electronic messaging service, etc.).

The computer-readable media 206 may store and/or execute a recommendation component 224 that generates recommendations for a user 106 to consider for their batch jobs, such as recommendations to modify a scheduling policy 212 or adopt a new scheduling policy 212.

The computer-readable media 206 may store and/or execute a model component 228 that is configured to train models 230 to identify optimized, or more optimal, scheduling policies 212 and/or scaling algorithms 216 for batch jobs. These models 230 may have been trained using training data for various batch jobs 122 that are performing well, or above certain performance thresholds, indicating that the scheduling policies 212 and scaling algorithms 216 are well suited for the various batch jobs 122. The models 230 may then receive the execution metrics 218 of the batch jobs 122 and output optimal scheduling policies 212 and/or scaling algorithms 216 for the batch jobs 122.

To utilize the services provided by the service provider network 102, the users 106 may register for an account 234 with the service provider network 102. For instance, users 106 may utilize a user device to interact with an identity and access management (IAM) component 232 that allows the users 106 to create user accounts 234 with the service provider network 102. Generally, the IAM component 232 may enable the users 106 to manage their network infrastructures remotely, and view information provided by the batch-processing service 104. Generally, the different user accounts 232 can assume different roles, or sets or permissions/credentials, that allow network users 106 to perform different actions, and be restricted from performing some actions.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
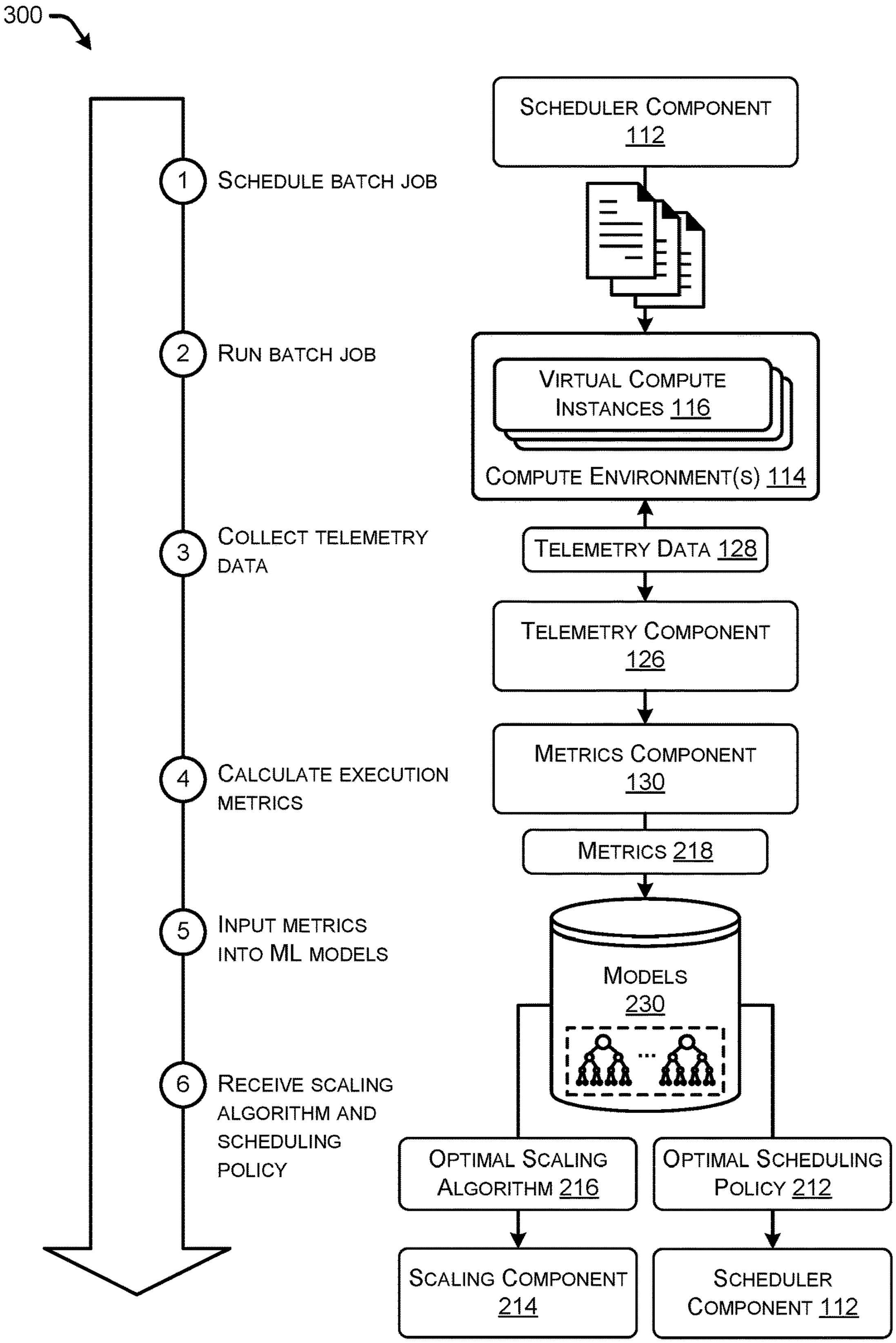
FIG. 3 illustrates a flow diagram of an example process for a batch-processing service to determine optimal scaling algorithms and scheduling policies for batch jobs.

FIG. 3 illustrates a flow diagram 300 of an example process for a batch-processing service 104 to determine optimal scaling algorithms and scheduling policies for batch jobs 122.

At "1," the scheduler component 112 may determine to schedule a batch job 122. For instance, the scheduler component 112 may identify a batch job 122 in a job queue 124 that is to be executed using a scheduling policy 212, and potentially a priority of the job 122 and/or job queue 124. In some instances, the scheduler component 112 may work in conjunction with the scaling component 214 to execute or dispatch the batch jobs 122. For instance, the scheduler component 112 may notify the scaling component 114 regarding an order in which jobs 122 are to be scheduled, and the scaling component 214 may scale the virtual compute instances 116, and/or select spin up/down different types of virtual compute instances 116, based on the jobs 122 that are going to be scheduled.

At "2," a compute environment 112 may run the batch job 122 on virtual compute instances 116. In some instances, a scaling component 214 may scale up or down the number of virtual compute instances 116 of a particular virtual instance type to run the batch job 122.

At "3," the telemetry component 126 may collect telemetry data 128. In some instances, the telemetry component 126 may receive the telemetry data 128 (e.g., pushed), and in other instances, telemetry component 126 may reach out to obtain the telemetry data 128 (e.g., pulled). The telemetry data 128 may be stored in a workload log, or a job 122 log, where each line in the log is a record of a job 122 that was run by the batch-processing service 104. The column of each record may include a time at which the job 122 request was created, when the job 122 was runnable, when the job 122 was started, when the job 122 was stopped, a size of the job 122, a job definition 120 of the job 122, and so forth. Further the telemetry data 128 may be stored in a compute resource log where each line of that log is a record of a snapshot of the compute resources launched for the job 122. The columns of each record may include timestamp data, a resource type and/or quantity launched for the batch job 122, a running duration for the batch job 122, and so forth.

At "4," the metrics component 130 may utilize the telemetry data 128 to calculate execution metrics 218. Generally, the execution metrics 218 may represent performance characteristics of the batch job 122 being executed in the compute environment 114. For instance, the execution metrics 218 that indicate, over a period of time, how many batch jobs 122 were successfully completed, how many batch jobs 122 failed, how many batch jobs 122 were retried, and/or other metrics. As another example, the metrics component 130 may determine execution metrics such as the amount of time between when jobs 122 are submitted and dispatched, the amount of time between when jobs are dispatched to be executed and when execution is complete, the number of jobs 122 running at different times, and so forth.

At “5,” the execution metrics 218 may be input into one or more ML models 230 that may have been trained using training data for various batch jobs that are performing well, or above certain performance thresholds, indicating that the scheduling policies and scaling algorithms are well suited for the various batch jobs. The models 230 may receive the execution metrics 218 for the batch jobs 122 and process the metrics 218. The models 230 may determine optimal scaling algorithms and scheduling policies for the batch jobs 122 based on the execution metrics 218. For instance, the models 230 may determine, based on an amount of time taken to execute the jobs 122, an optimal virtual compute instance 116 type for the scaling algorithm to use to execute the jobs 122. As another example, the models 230 may determine that a particular job 122 type should be prioritized by the scheduler component 112 in a scheduling policy 212 over another job 122 type based on the functions that the jobs 122 perform. As a further, example, the models 230 may determine that an average run time for a batch job 122 is longer than a desired or permissible threshold, and that an additional number of virtual compute instances 116 should be scaled up in the scaling algorithms 216 to execute the particular batch job 122.

At “6,” the ML models 230 may output an optimal scheduling policy 212 and/or an optimal scaling algorithm 216 for the batch jobs 122. The optimal scaling algorithm 216 may include rules or parameters to scale virtual compute instances 116 such that performance of the batch job 122 is optimized (e.g., sufficient resources, sufficient timing, etc.). The optimal scheduling policy 212 may indicate optimal times for batch jobs, and/or sequences of batch jobs 122, to be run on the virtual compute instances 116 and/or other parameters (e.g., in which compute environment 114 the jobs 122 will run, on which virtual compute instances 116 the jobs 122 will run, etc.). The optimal scaling algorithm 216 may be provided to, and used by, the scaling component 214 for future batch jobs 122. Similarly, the optimal scheduling policy 212 may be provided to, and used by, the scheduler component 112 for future batch jobs 122.

Figure 4:
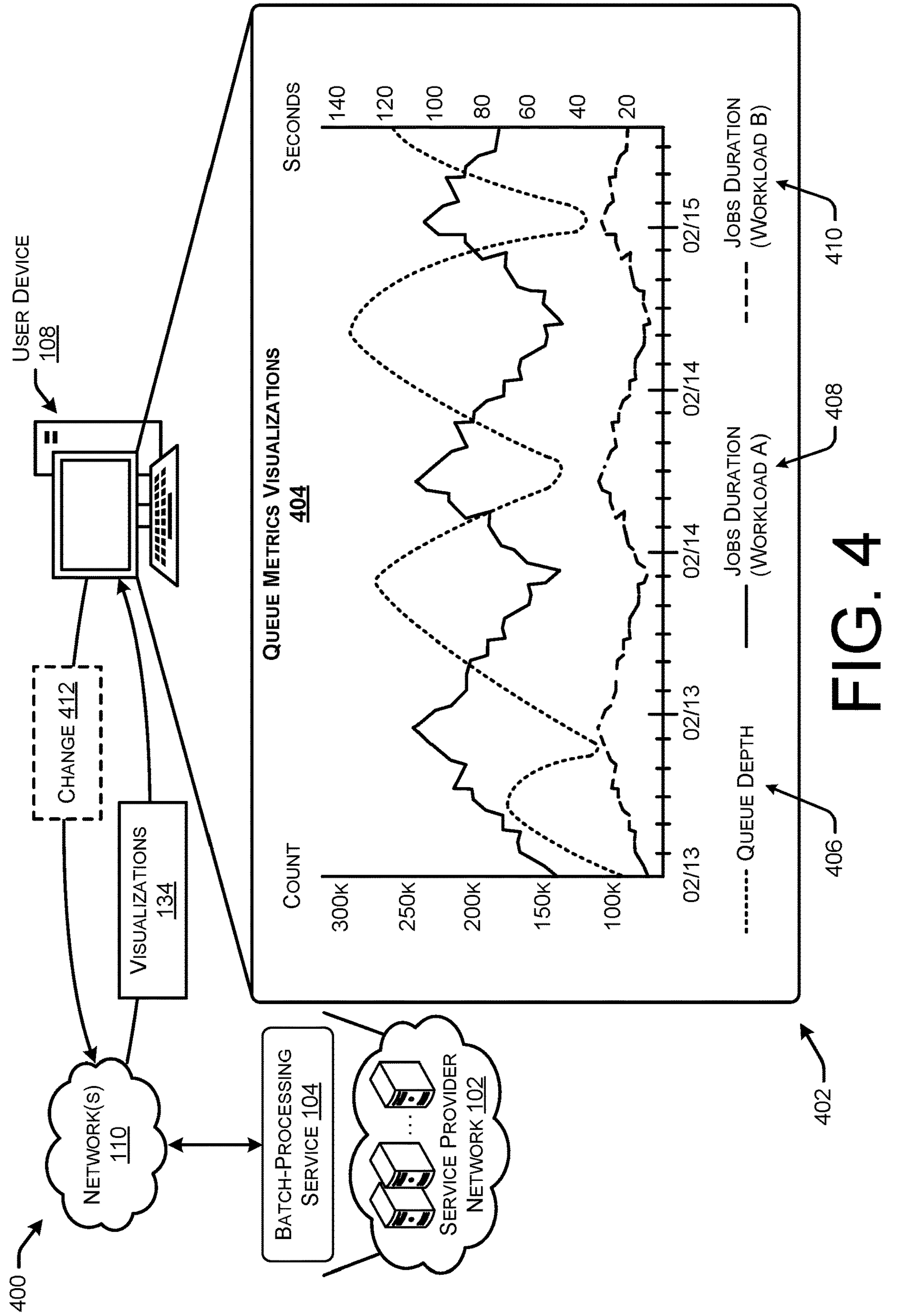
FIG. 4 illustrates a graphical user interface illustrating a visualization of queue metrics for a batch job queue of a user account.

FIG. 4 illustrates a graphical user interface (GUI) 402 illustrating a visualization 132 of queue metrics 218 for a batch job queue 124 of a user account 234. It should be understood that the GUI is merely illustrative and any type of user interface, or combination of user interfaces, may be utilized to present the visualization 132 of queue metrics 218.

As shown, the batch-processing service 104 may provide a user device 108 with access to visualizations 132 that are presented in an interface 402. The visualizations 132 in this example are queue metrics visualizations 404. As shown, the queue metrics visualizations 404 represent a queue depth 406, a metric indicating a duration (e.g., average run time) for running jobs 122 included in a workload A, and a metric indicating a duration (e.g., average run time) for running jobs 122 included in a workload B. These visualizations 404 illustrate to the user 106 metrics for their jobs 122 and may result in the user 106 desiring to make a change with how their jobs 122 are scheduled and/or scaling is performed. For instance, the queue depth 406 may be larger than the user 106 would like, and the user 106 may (optionally) submit a change 412 to the batch-processing service 104 to change various aspects of the batch processing for their batch jobs 122. The change 412 could be a change to the scheduling policy 212, a change to the scaling algorithm 216, a change to the type of virtual computing instance 116 used for their jobs 122, and so forth.

Figure 5:
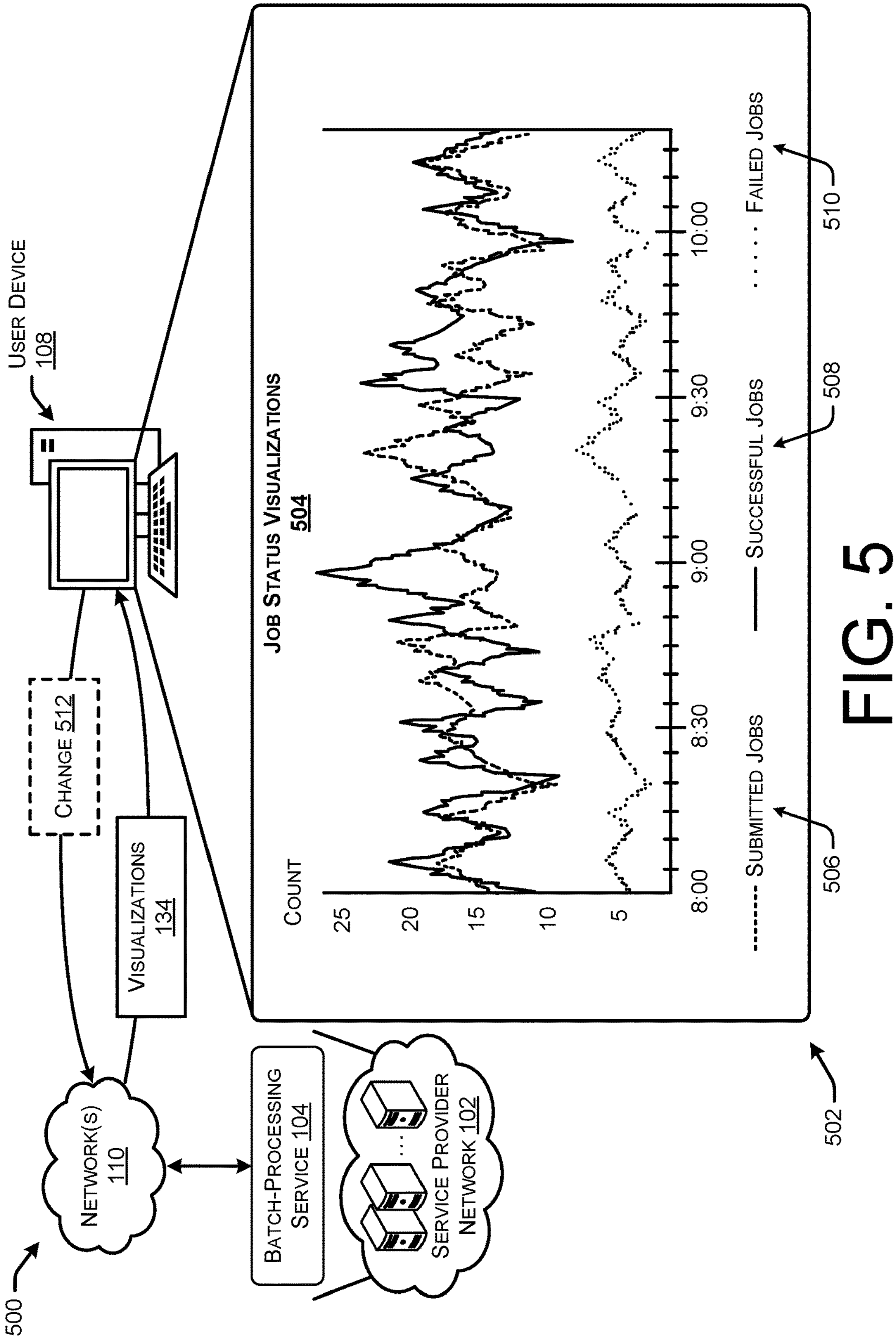
FIG. 5 illustrates a graphical user interface illustrating a visualization of job status metrics for batch jobs of a user account for a period of time.

FIG. 5 illustrates a graphical user interface illustrating a visualization 134 of job status metrics for batch jobs 122 of a user account for a period of time. It should be understood that the GUI 502 is merely illustrative and any type of user interface, or combination of user interfaces, may be utilized to present the visualization of job status metrics for jobs 122.

As shown, the batch-processing service 104 may provide a user device 108 with access to visualizations 132 that are presented in an interface 502. The visualizations 132 in this example are job status visualizations 504. As shown, the job status visualizations 504 represent submitted jobs 506 for a user 106, successful jobs 508 for the user 106, and failed jobs 510 for the user 106. These visualizations 504 illustrate to the user 106 metrics for their jobs 122 and may result in the user 106 desiring to make a change with how their jobs 122 are scheduled and/or scaling is performed. The change 412 could be a change to the scheduling policy, a change to the scaling algorithm, a change to the type of virtual computing instance 116 used for their jobs 122, and so forth. In a specific example, if the failed jobs 510 are too high, the user 106 may determine a reason the jobs 122 are failing, such as a type of the virtual compute instance 116 being used having insufficient resources to support the jobs 122, the user 106 may (optionally) submit a change 512. In this case, the change 512 may be to use a different type of virtual compute instance 116 to run the jobs 112 that has sufficient computing resources for running the jobs 112.

Figure 6:
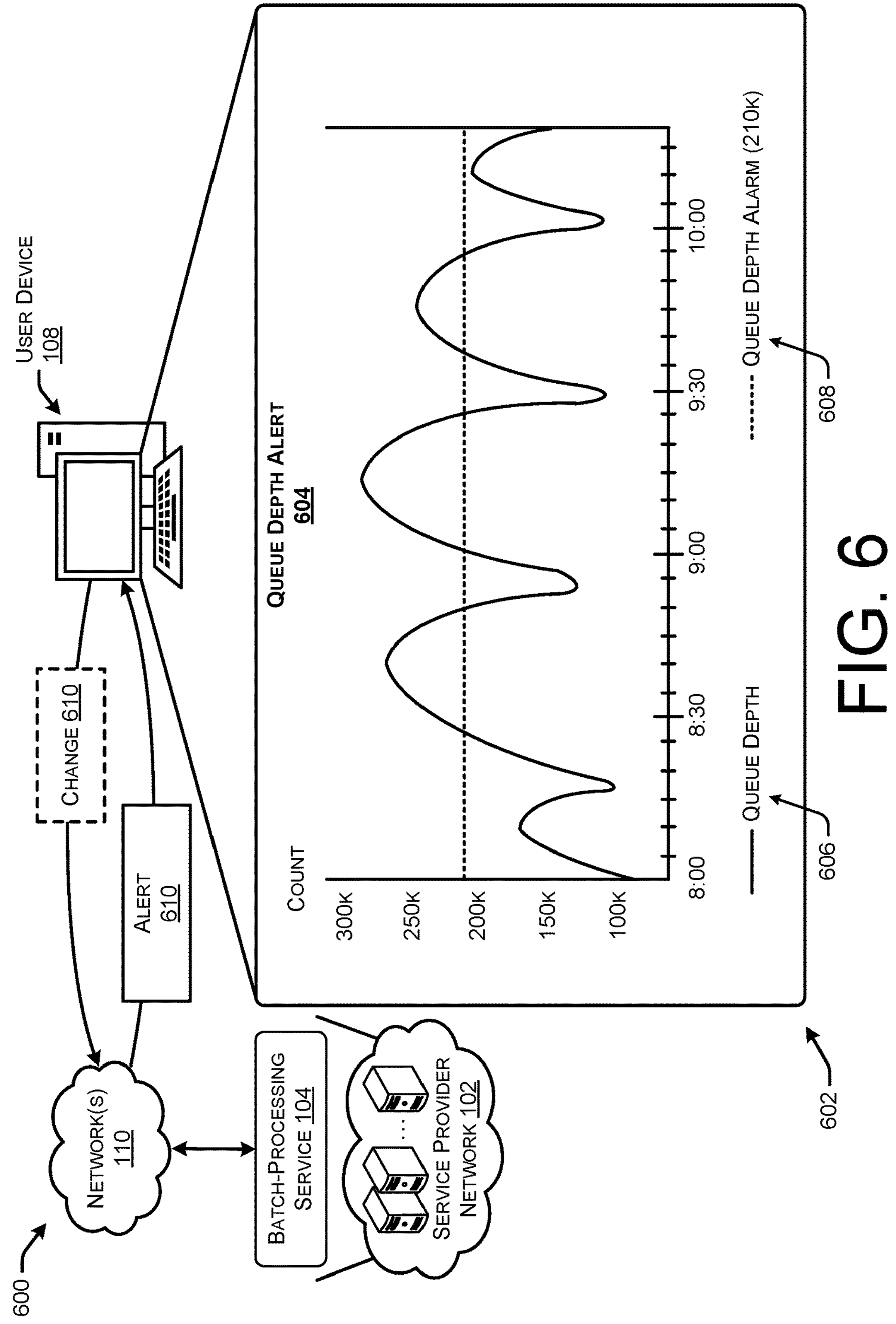
FIG. 6 illustrates a graphical user interface illustrating a visualization of a queue depth metric violating a threshold depth associated with an alarm, and a user receiving an alert indicating the violation.

FIG. 6 illustrates a graphical user interface illustrating a visualization of a queue depth metric violating a threshold depth associated with an alarm, and a user receiving an alert indicating the violation.

As shown, the queue depth alert visualization 604 indicates the queue depth 606, or the number of jobs 122 in a job queue 124. Additionally, the queue depth alert visualization 604 indicates a queue depth alarm 608 which indicates a queue depth 606 at which the user would like to be notified when violated. The user 106 may desire that the queue depth 606 stay below the queue depth alarm threshold 608, and the alarm/alert 610 may result in the user 106 desiring to make a change with how their jobs 122 are scheduled and/or scaling is performed. The change 610 could be a change to the scheduling policy, a change to the scaling algorithm, a change to the type of virtual computing instance 116 used for their jobs 122, and so forth.

FIGS. 7A, 7B, 8, and 9 illustrate flow diagrams of example methods 700, 800, and 900 that illustrate aspects of the functions performed at least partly by the service provider network 102 as described in this disclosure. The logical operations described herein with respect to FIGS. 7A, 7B, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7A, 7B, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7A:
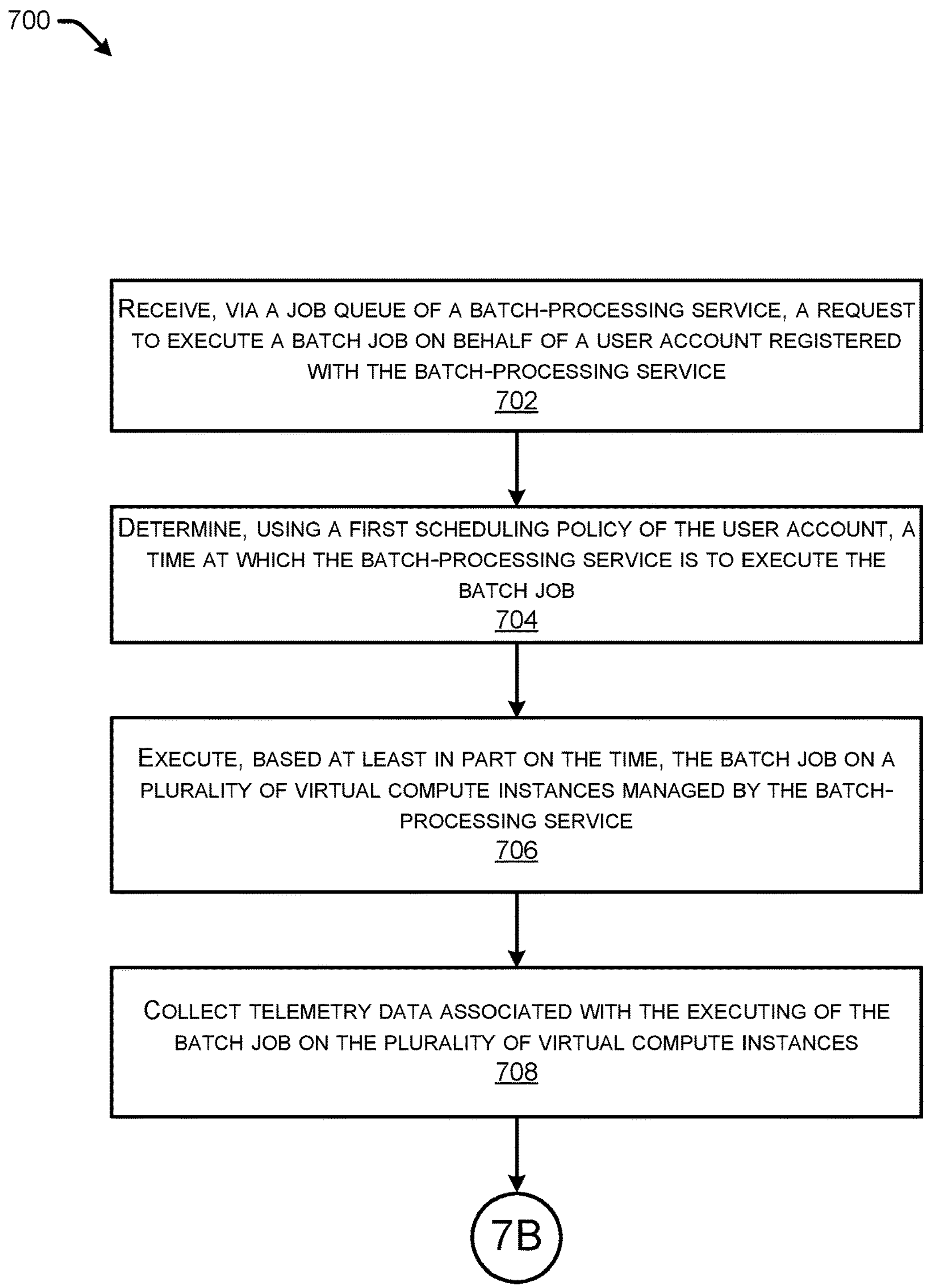
FIGS. 7A and 7B collectively illustrate a flow diagram of an example method for a batch-processing service that executes a batch job, provides a visualization around execution metrics for the batch job, and determines a more optimized scheduling policy for running subsequent batch jobs.
Figure 7B:
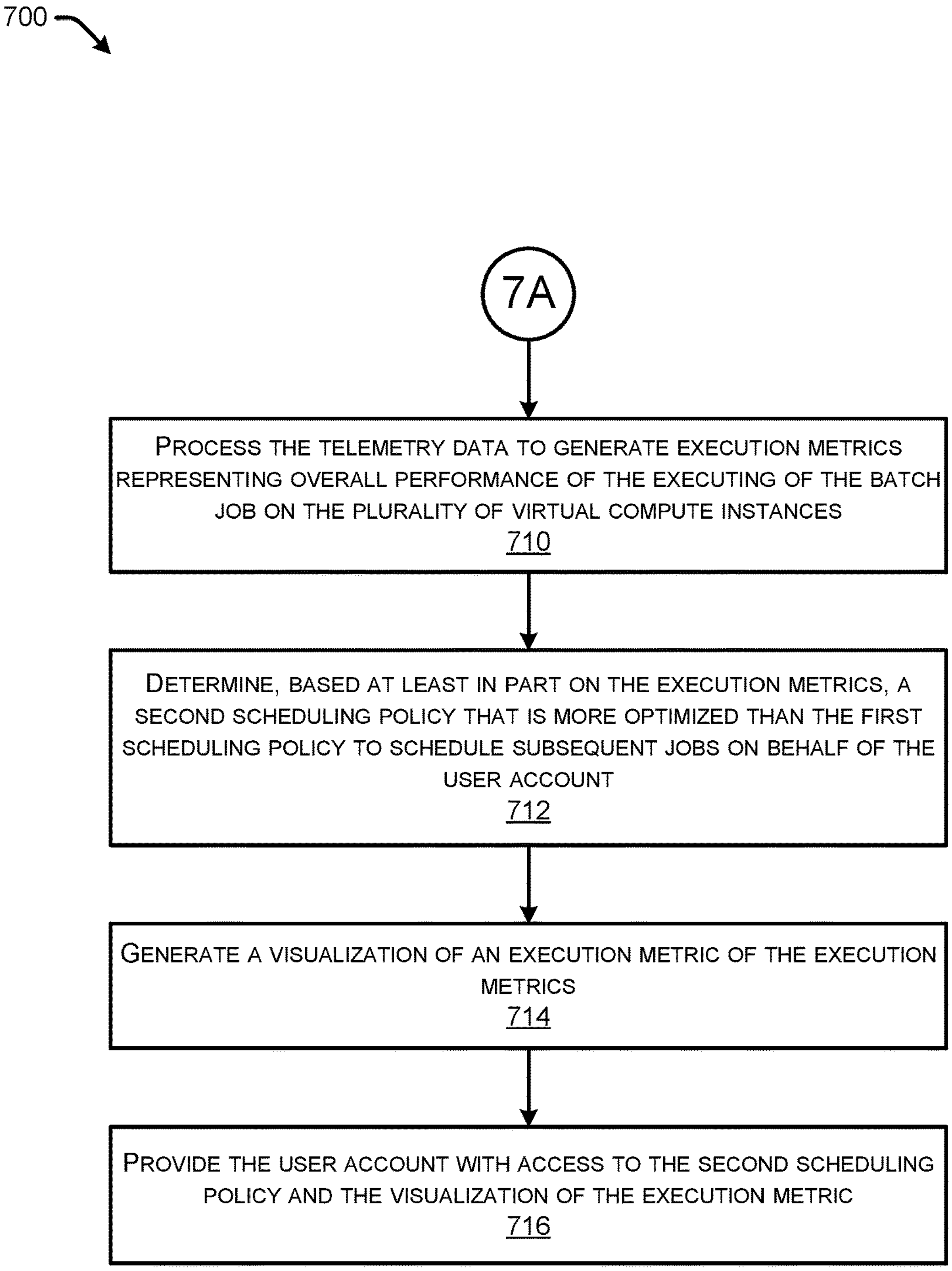

FIGS. 7A and 7B collectively illustrate a flow diagram of an example method 700 for a batch-processing service 104 that executes a batch job 122, provides a visualization 132 around execution metrics 218 for the batch job 122, and determines a more optimized scheduling policy 212 for running subsequent batch jobs 122.

At 702, the batch processing service 104 may receive, via a job queue 124 of the batch-processing service 104, a request to execute a batch job 122 on behalf of a user account 234 registered with the batch-processing service 104. In some instances, the request may be submitted directly from the user account 234, and in other examples, the request may be triggered automatically based on a scheduling policy 212 associated with the user account 234.

At 704, the batch processing service 104 may determine, using a first scheduling policy 212 of the user account 234, a time at which the batch-processing service 104 is to execute the batch job 122. For instance, the scheduler component 112 may use a scheduling policy 212 to determine the time at which the batch job 122 is to be executed, and notify the scaling component 214 that the batch job 122 is to be executed at the time. The scaling component 214 may then scale up or down virtual compute instances 116 to run the batch job 122.

At 706, the batch processing service 104 may, based at least in part on the time, execute the batch job 122 on a plurality of virtual compute instances 116 managed by the batch-processing service 104. In some instances, executing the batch job 122 may include dispatching, by the scheduling component 112, a request to a compute environment 114 to execute the batch job 122.

At 708, the batch processing service 104 may collect telemetry data 128 associated with the executing of the batch job 122 on the plurality of virtual compute instances. The telemetry data 128 may be logged as time-series data that is logged for different stages of execution of the batch jobs 122, and by different components of the execution pipeline. For instance, the front-end component 118 may store telemetry data 128 about the batch job 122 arrival rate and distribution. The scheduler component 112 may log and store telemetry data 128 about the durations and/or sizes of the batch jobs 122. A controller that manages the scaling of the virtual computing instances 116 may store telemetry data 126 around the virtual computing instance 116 types, the scaling algorithms 216, amounts of computing resources utilized by batch jobs 122, and/or other execution data.

At 710, the batch processing service 104 may process the telemetry data 126 to generate execution metrics 218 representing overall performance of the executing of the batch job 122 on the plurality of virtual compute instances 116. As an example, the metrics component 130 may analyze the raw data of the telemetry data 128 and determine insights or metrics, such as average amounts of compute used by jobs 122 over time, average number of jobs in a queue 124 over time, and so forth.

At 712, the batch processing service 104 may determine, based at least in part on the execution metrics 218, a second scheduling policy 212 that is more optimized than the first scheduling policy 212 to schedule subsequent jobs 122 on behalf of the user account 234. In some instances, determining the second scheduling policy 212 may include modifying the first scheduling policy 212, such as changing priorities of jobs 122 to be scheduled, changing times at which jobs 122 are scheduled, etc.

At 714, the batch processing service 104 may generate a visualization 132 of an execution metric 218 of the execution metrics 218. For instance, the visualizations component 220 may create graphs, charts, etc., to represent the execution metrics 218.

At 716, the batch processing service 104 may provide the user account 234 with access to the second scheduling policy 212 and the visualization 132 of the execution metric 218. For instance, the user 106 may use their user account 234 to log into a console and view the visualization 132.

Figure 8:
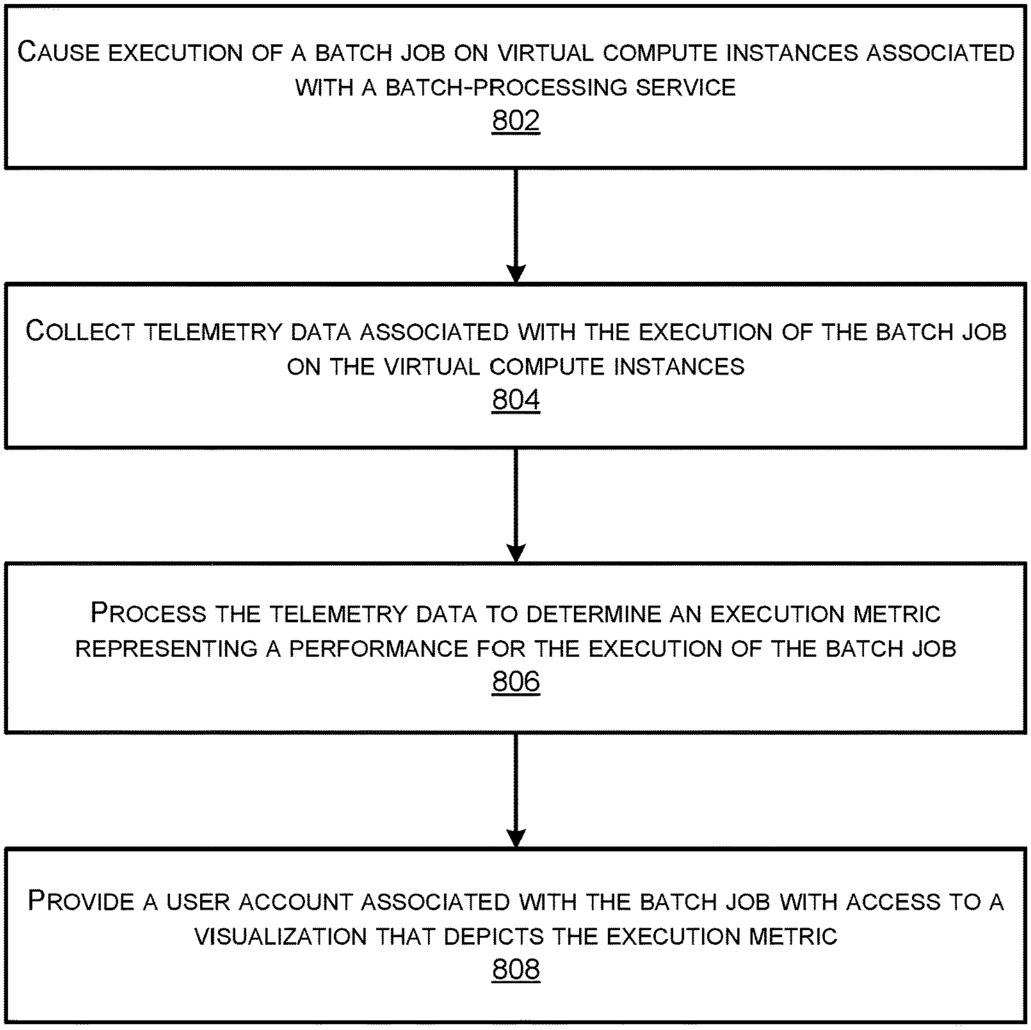
FIG. 8 illustrates a flow diagram of an example method for a batch-processing service that executes a batch job, and provides a visualization around an execution metric for the batch job.

FIG. 8 illustrates a flow diagram of an example method 800 for a batch-processing service 104 that executes a batch job 122, and provides a visualization 132 around an execution metric 218 for the batch job 122.

At 802, the batch processing service 104 may cause execution of a batch job on virtual compute instances associated with a batch-processing service. In some instances, causing execution of the batch job 122 may include dispatching, by the scheduling component 112, a request to a compute environment 114 to execute the batch job 122.

At 804, the batch processing service 104 may collect telemetry data 128 associated with the execution of the batch job 122 on the virtual compute instances 116. The telemetry data 128 may be logged as time-series data that is logged for different stages of execution of the batch jobs 122, and by different components of the execution pipeline. For instance, the front-end component 118 may store telemetry data 128 about the batch job 122 arrival rate and distribution. The scheduler component 112 may log and store telemetry data 128 about the durations and/or sizes of the batch jobs 122. A controller that manages the scaling of the virtual computing instances 116 may store telemetry data 126 around the virtual computing instance 116 types, the scaling algorithms 216, amounts of computing resources utilized by batch jobs 122, and/or other execution data.

At 806, the batch processing service 104 may process the telemetry data 128 to determine an execution metric 218 representing a performance for the execution of the batch job 122. As an example, the metrics component 130 may analyze the raw data of the telemetry data 128 and determine insights or metrics, such as average amounts of compute used by jobs 122 over time, average number of jobs in a queue 124 over time, and so forth.

At 808, the batch processing service 104 may provide a user account 234 associated with the batch job 122 with access to a visualization 132 that depicts the execution metric 218. For instance, the visualizations component 220 may create graphs, charts, etc., to represent the execution metrics 218, and the visualization 132 may be accessible via a console associated with the user account 234.

FIG. 9 illustrates a flow diagram of an example method 900 for a batch-processing service that executes a batch job, and uses an execution metric for the batch job to identify a more optimal scheduling policy.

At 902, the batch processing service 104 may receive, at a batch-processing service, a request to execute a batch job 122 on behalf of a user account 234 registered with the batch-processing service 104. In some instances, the request may be submitted directly from the user account 234, and in other examples, the request may be triggered automatically based on a scheduling policy 212 associated with the user account 234.

At 904, the batch processing service 104 may determine, using a first scheduling policy, a time at which the batch-processing service is to execute the batch job. For instance, the scheduler component 112 may use a scheduling policy 212 to determine the time at which the batch job 122 is to be executed, and notify the scaling component 214 that the batch job 122 is to be executed at the time. The scaling component 214 may then scale up or down virtual compute instances 116 to run the batch job 122.

At 906, the batch processing service 104 may, based at least in part on the time, cause execution of the batch job on virtual compute instances associated with the batch-processing service. In some instances, causing execution of the batch job 122 may include dispatching, by the scheduling component 112, a request to a compute environment 114 to execute the batch job 122.

At 908, the batch processing service 104 may collect telemetry data 128 associated with the execution of the batch job 122 on the virtual compute instances 116. The telemetry data 128 may be logged as time-series data that is logged for different stages of execution of the batch jobs 122, and by different components of the execution pipeline. For instance, the front-end component 118 may store telemetry data 128 about the batch job 122 arrival rate and distribution. The scheduler component 112 may log and store telemetry data 128 about the durations and/or sizes of the batch jobs 122. A controller that manages the scaling of the virtual computing instances 116 may store telemetry data 126 around the virtual computing instance 116 types, the scaling algorithms 216, amounts of computing resources utilized by batch jobs 122, and/or other execution data.

At 910, the batch processing service 104 may process the telemetry data 128 to determine an execution metric 218 representing a performance for the execution of the batch job 122. As an example, the metrics component 130 may analyze the raw data of the telemetry data 128 and determine insights or metrics, such as average amounts of compute used by jobs 122 over time, average number of jobs in a queue 124 over time, and so forth.

At 912, the batch processing service 104 may determine, based at least in part on the execution metrics 218, a second scheduling policy 212 that is more optimized than the first scheduling policy 212 to schedule subsequent jobs 122 on behalf of the user account 234. In some instances, determining the second scheduling policy 212 may include modifying the first scheduling policy 212, such as changing priorities of jobs 122 to be scheduled, changing times at which jobs 122 are scheduled, etc. The second scheduling policy 212 may cause performance of the execution of the jobs 122 to improve, such as less failed jobs, more efficient use of resources, lesser time taken to execute the jobs 122, and so forth.

At 914, the batch processing service 104 may use the second scheduling policy 212, causing execution of a subsequent batch job 122 at a subsequent time. For instance, the second scheduling policy 212 may be used to schedule jobs 122 such that the particular job 122 may be scheduled at a different time, using a different type of virtual compute instance 116, according to a different priority, and/or using other scheduling parameters.

Figure 10:
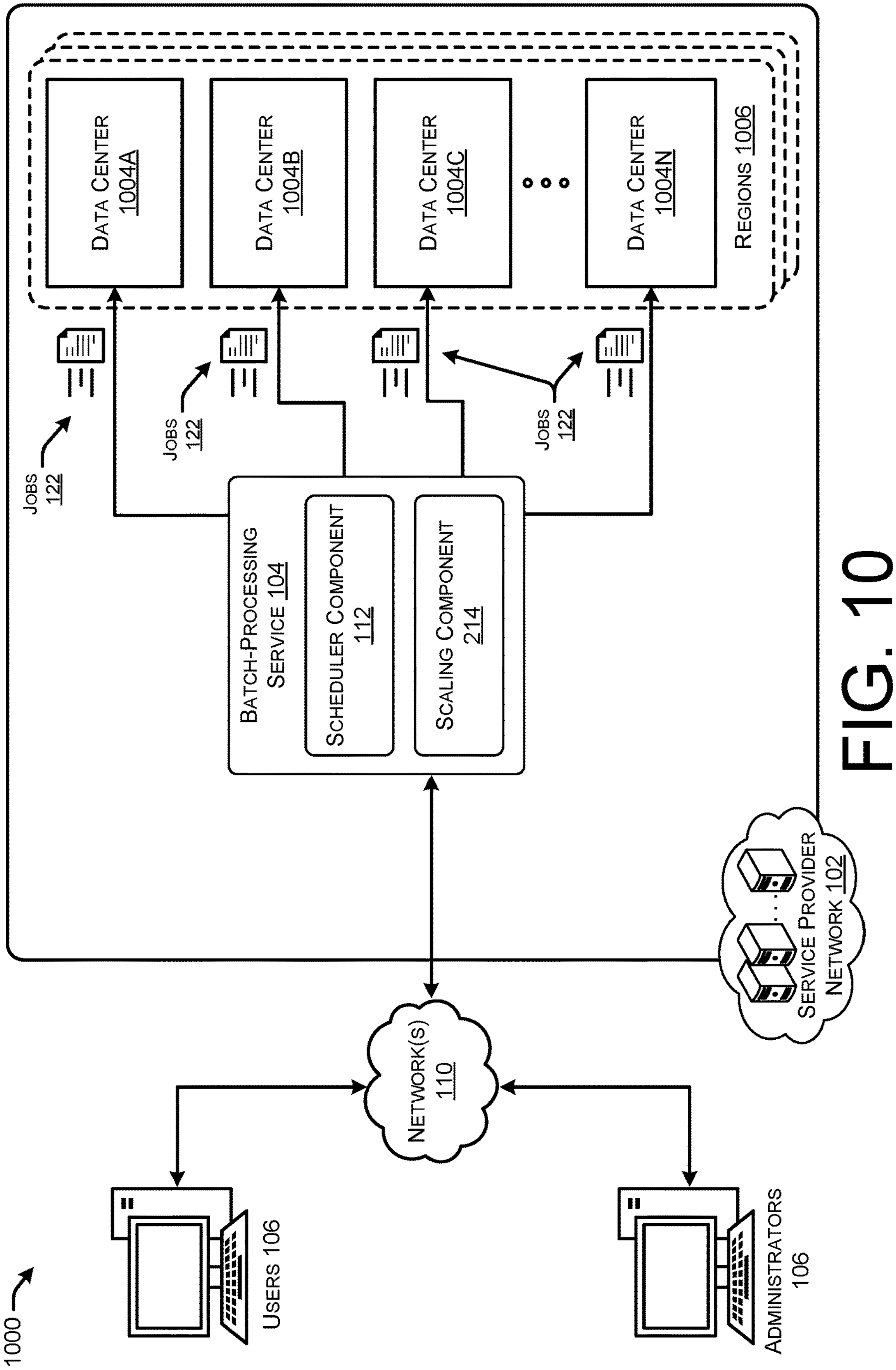
FIG. 10 is a system and network diagram that shows an illustrative operating environment that includes data centers of a service provider network that can be configured to implement aspects of the functionality described herein.

FIG. 10 is a system and network diagram 1000 that shows an illustrative operating environment that includes data centers 1004 in one or more regions 1006 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1008. One illustrative embodiment for a data center 1004 that can be utilized to implement the technologies disclosed herein will be described below with regard to FIG. 11.

The users 106, such as administrators 106, of the user devices 108 that utilize the service provider network 102 may access the computing resources provided by the service provider network 102 over any wired and/or wireless network(s) 110, which can be a wide area communication network ("WAN"), such as the Internet, an intranet or an Internet service provider ("ISP") network or a combination of such networks. For example, and without limitation, a user device operated by a user 106 of the service provider network 102 may be utilized to access the service provider network 102 by way of the network(s) 118. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
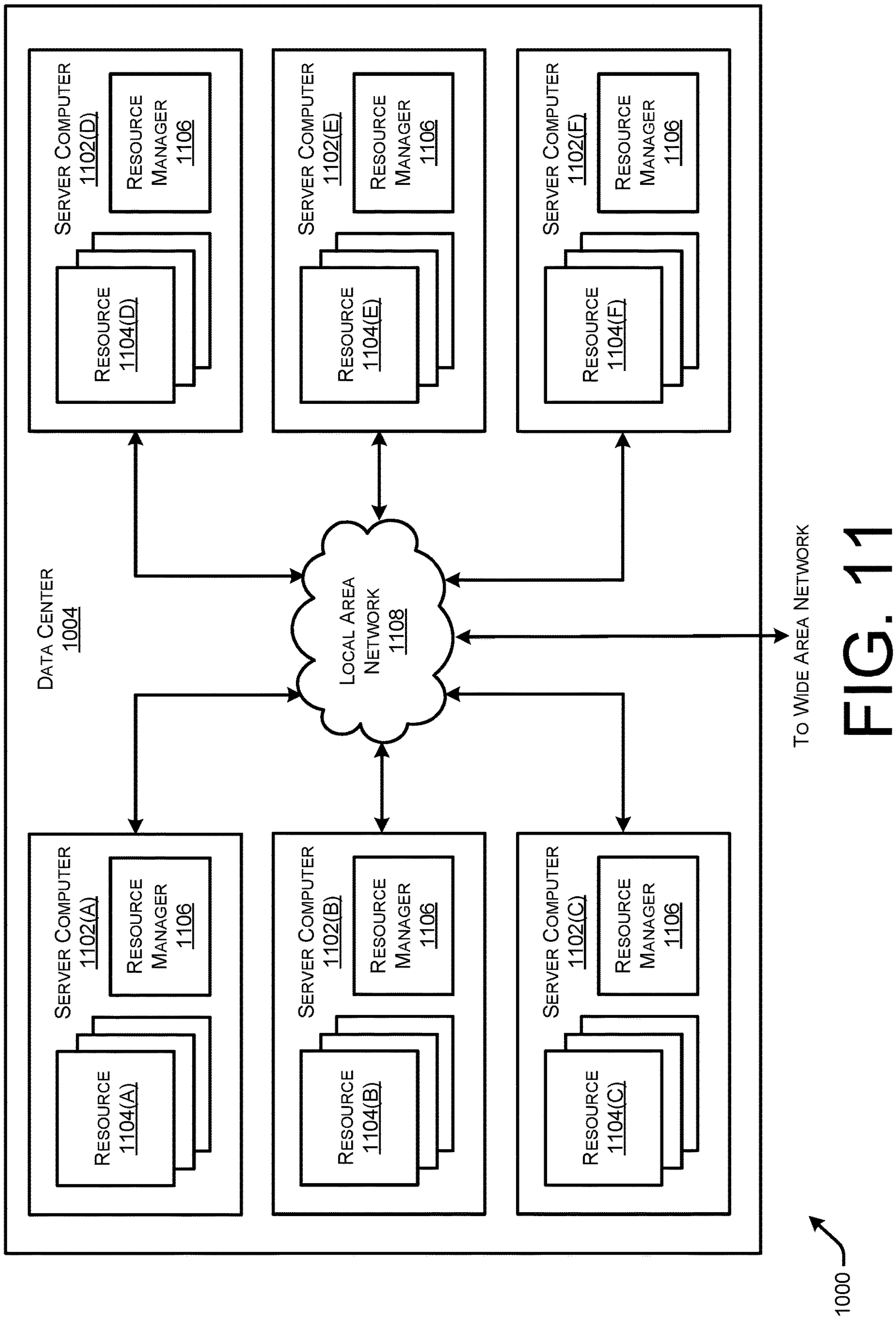
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

Figure 12:
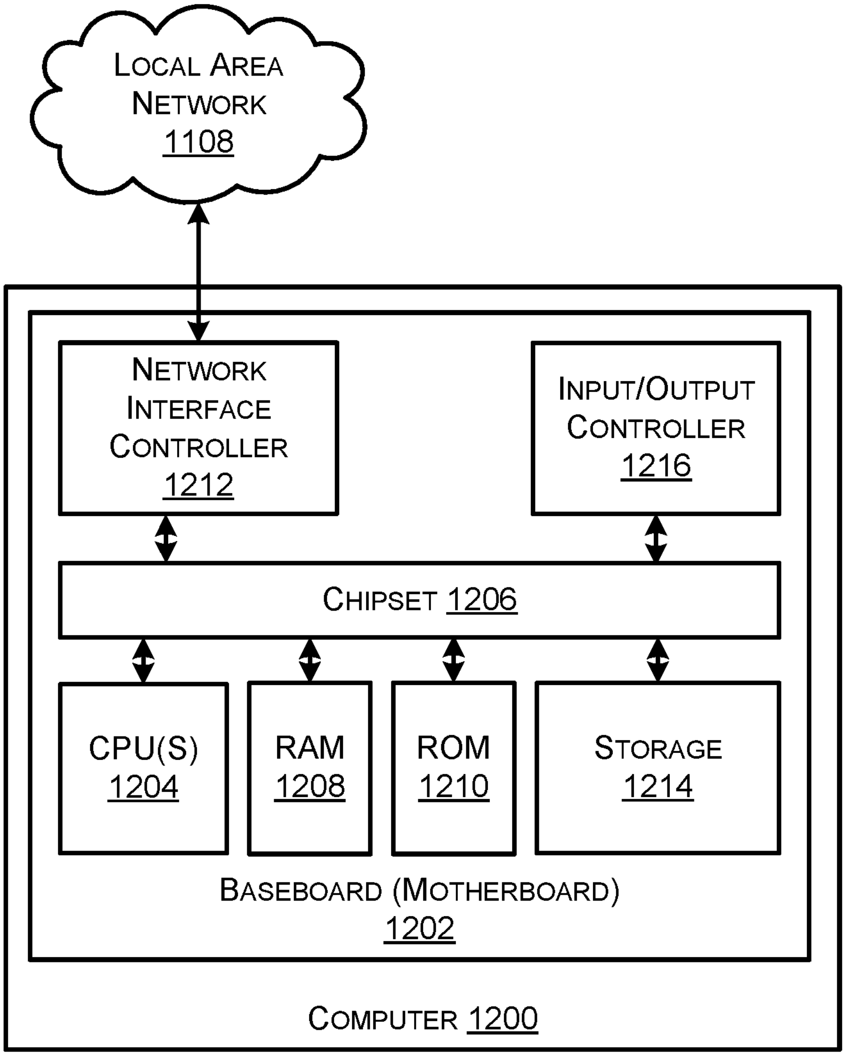
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1208. The chipset 1206 can include functionality for providing network connectivity through a network interface controller (NIC) 1212, such as a gigabit Ethernet adapter. The NIC 1212 is capable of connecting the computer 1200 to other computing devices over the network 1208 (or 110). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 102, and or any components included therein, may be supported by one or more devices similar to computer 1200. Stated otherwise, some or all of the operations performed by the service provider network 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method executed at least partly by a batch-processing service of a service provider network, the method comprising:

receiving, via a job queue of the batch-processing service, a request to execute a batch job on behalf of a user account registered with the batch-processing service;

executing, according to a first scheduling policy of the user account, the batch job on a plurality of virtual compute instances managed by the batch-processing service;

receiving telemetry data associated with the executing of the batch job on the plurality of virtual compute instances, wherein the telemetry data is based on amounts of computing resources utilized by the batch job during the executing;

generating a visualization that includes a graphical representation of a plurality of execution metrics over time for the batch job, wherein the plurality of execution metrics is based on the telemetry data, represent overall performance of the executing of the batch job on the plurality of virtual compute instances, and comprise a job duration metric and a queue depth metric indicating an average number of jobs in the job queue over time;

outputting a second scheduling policy by the batch-processing service utilizing one or more models and the plurality of execution metrics, wherein the one or more models have been trained using training data for batch jobs executing on the plurality of virtual compute instances with an average run time less than a permissible threshold;

automatically executing at least one subsequent batch job on the plurality of virtual compute instances on behalf of the user account using the second scheduling policy, wherein the second scheduling policy is more optimized than the first scheduling policy to schedule subsequent batch jobs on behalf of the user account; and providing the user account with access to the second scheduling policy and the visualization of the plurality of execution metrics.

2. The method of claim 1, wherein the telemetry data is associated with the executing of a plurality of batch jobs including the batch job, and the visualization of the plurality of execution metrics depicts one or more of:

first amounts of time between when executions for each of the plurality of batch jobs were requested and when the executions for each of the plurality of batch jobs were started;

second amounts of time between when executions for each of the plurality of batch jobs were started and when the executions for each of the plurality of batch jobs were completed;

a first number of the plurality of batch jobs that were submitted over a period of time;

a second number of the plurality of batch jobs for which execution was completed;

a third number of the plurality of batch jobs that failed to be executed; or a fourth number of the plurality of batch jobs in the job queue over a period of time.

3. The method of claim 1, further comprising:

receiving a subsequent request to execute a subsequent batch job that at least partially corresponds to the batch job; and using a modified scaling algorithm or a second scaling algorithm, executing the subsequent batch job on a number of the plurality of virtual compute instances managed by the batch-processing service, wherein:

the number is based on a first scaling algorithm, the modified scaling algorithm is based on a modification of the first scaling algorithm using the plurality of execution metrics, and the second scaling algorithm is based on the plurality of execution metrics.

4. A system comprising:

one or more processors; and one or more computer-readable media storing computer-executable instructions that, when executed by the one or more processors, cause the one or more processors to execute operations comprising:

causing execution of a batch job on a plurality of virtual compute instances associated with a batch-processing service according to a first scheduling policy of a user account associated with the batch job;

receiving telemetry data associated with the execution of the batch job on the plurality of virtual compute instances, wherein the telemetry data is based on amounts of computing resources utilized by the batch job during the execution;

generating a visualization that includes a graphical representation of a plurality of execution metrics over time for the batch job, wherein the plurality of execution metrics is based on the telemetry data, represent overall performance of the executing of the batch job on the plurality of virtual compute instances, and comprise a job duration metric and a queue depth metric indicating an average number of jobs in the job queue over time;

outputting a second scheduling policy by the batch-processing service utilizing one or more models and the plurality of execution metrics, wherein the one or more models have been trained using training data for batch jobs executing on the plurality of virtual compute instances with an average run time less than a permissible threshold;

automatically executing at least one subsequent batch job on the plurality of virtual compute instances on behalf of the user account using the second scheduling policy, wherein the second scheduling policy is more optimized than the first scheduling policy to schedule subsequent batch jobs on behalf of the user account; and providing the user account with access to the second scheduling policy and the visualization of the plurality of execution metrics.

5. The system of claim 4, the operations further comprising:

executing, using the batch-processing service, the batch job at a first time, wherein the first time is based on the first scheduling policy associated with the user account; and storing an association between the user account and the second scheduling policy such that the second scheduling policy is used to schedule execution of the at least one subsequent batch job.

6. The system of claim 4, the operations further comprising:

receiving a request to execute the at least one subsequent batch job on behalf of the user account; and using a modified scaling algorithm or a second scaling algorithm different from a first scaling algorithm, executing the at least one subsequent batch job on a second number of virtual compute instances managed by the batch-processing service, wherein:

a first number of virtual compute instances is based on the first scaling algorithm, the modified scaling algorithm is based on a modification of the first scaling algorithm using the plurality of execution metrics or another execution metric, and the second scaling algorithm is based on the plurality of execution metrics or another execution metric.

7. The system of claim 4, the operations further comprising: causing, by the batch-processing service, execution of the at least one subsequent batch job on behalf of the user account over a period of time.

8. The system of claim 4, wherein the visualization that includes the graphical representation of the plurality of execution metrics includes one or more of:

first amounts of time between when execution of the at least one subsequent batch job was submitted and when the execution of the at least one subsequent batch job was started; or second amounts of time between when execution of the at least one subsequent batch job was started and when the execution of the at least one subsequent batch job was completed.

9. The system of claim 4, wherein the visualization that includes the graphical representation of the plurality of execution metrics includes one or more of:

a first number of the at least one subsequent batch job that was submitted over a period of time;

a second number of the at least one subsequent batch job for which execution was completed;

a third number of the at least one subsequent batch job that failed to be executed; or a fourth number of the at least one subsequent batch job in a job queue over a period of time.

10. The system of claim 4, wherein the visualization that includes the graphical representation of the plurality of execution metrics includes one or more of:

a virtual instance type of the virtual compute instances, wherein the batch-processing service offers a plurality of virtual instance types on which to execute batch jobs;

a primary computing resource type utilized during execution of the batch job;

an amount of a particular computing resource type utilized during execution of the batch job; or a total amount of computing resources utilized during execution of the batch job.

11. The system of claim 4, the operations further comprising:

receiving input from the user account indicating a threshold indicating a minimum performance metric for the execution of the batch job; and responsive to a specific execution metric violating the threshold indicating the minimum performance metric, sending an alert to the user account indicating that the specific execution metric for the batch job violated the threshold indicating the minimum performance metric.

12. The system of claim 4, the operations further comprising:

prior to a time at which execution of the batch job is to be executed, scaling up a portion of the virtual compute instances used to execute the batch job, wherein the time is based on a historical execution pattern according to which the batch job is executed during a period of time, and wherein the historical execution pattern is based on the telemetry data.

13. The system of claim 4, the operations further comprising:

scaling up the virtual compute instances according to a first scaling algorithm to use for executing the batch job;

scaling up second virtual compute instances according to a modified scaling algorithm or a second scaling algorithm that differs from the first scaling algorithm to use for executing the at least one subsequent batch job; and executing the at least one subsequent batch job on behalf of the user account, wherein:

the modified scaling algorithm is based on a modification of the first scaling algorithm using the plurality of execution metrics or another execution metric, and the second scaling algorithm is based on the plurality of execution metrics or another execution metric.

14. The system of claim 4, wherein: the plurality of execution metrics indicates a number of idle virtual compute instances of the virtual compute instances; and the visualization depicts the number of the idle virtual compute instances.

15. A method comprising:

receiving, at a batch-processing service, a request to execute a batch job on behalf of a user account registered with the batch-processing service;

causing execution of the batch job on a plurality of virtual compute instances associated with the batch-processing service according to a first scheduling policy of the user account;

receiving telemetry data associated with the execution of the batch job on the plurality of virtual compute instances, wherein the telemetry data is based on amounts of computing resources utilized by the batch job during the execution;

generating a visualization that includes a graphical representation of a plurality of execution metrics over time for the batch job, wherein the plurality of execution metrics is based on the telemetry data, represent overall performance of the executing of the batch job on the plurality of virtual compute instances, and comprise a job duration metric and a queue depth metric indicating an average number of jobs in the job queue over time;

outputting a second scheduling policy by the batch-processing service utilizing one or more models and the plurality of execution metrics, wherein the one or more models have been trained using training data for batch jobs executing on the plurality of virtual compute instances with an average run time less than a permissible threshold;

automatically executing at least one subsequent batch job on the plurality of virtual compute instances on behalf of the user account using the second scheduling policy, wherein the second scheduling policy is more optimized than the first scheduling policy to schedule a plurality of subsequent batch jobs on behalf of the user account; and providing the user account with access to the second scheduling policy and the visualization of the plurality of execution metrics.

16. The method of claim 15, further comprising: receiving input from the user account indicating another request to use the second scheduling policy to schedule the plurality of subsequent batch jobs.

17. The method of claim 15, further comprising:

receiving a request to execute the subsequent batch job on behalf of the user account; and using a modified scaling algorithm or a second scaling algorithm, executing the batch job on a second number of virtual compute instances managed by the batch-processing service, wherein:

a first number of virtual compute instances is based on the first scaling algorithm, the modified scaling algorithm is based on a modification of the first scaling algorithm using the plurality of execution metrics or another execution metric, and the second scaling algorithm is based on the plurality of execution metrics or another execution metric.

18. The method of claim 15, further comprising: causing, by the batch-processing service, execution of a plurality of batch jobs on behalf of the user account over a period of time.

19. The method of claim 18, wherein the visualization that includes the graphical representation of the plurality of execution metrics includes one or more of:

first amounts of time between when executions for each of the plurality of batch jobs were submitted and when the executions for each of the plurality of batch jobs were started; or second amounts of time between when executions for each of the plurality of batch jobs were started and when the executions for each of the plurality of batch jobs were completed.

20. The method of claim 18, wherein the visualization that includes the graphical representation of the plurality of execution metrics includes one or more of:

a first number of the plurality of batch jobs that were submitted over a period of time;

a second number of the plurality of batch jobs for which execution was completed;

a third number of the plurality of batch jobs that failed to be executed; or a fourth number of the plurality of batch jobs in a job queue over a period of time.

* * * * *